United States Patent
Richards et al.

(10) Patent No.: US 6,178,207 B1
(45) Date of Patent: Jan. 23, 2001

(54) AIRCRAFT COMBAT TRAINING SIGNAL PROCESSING SYSTEM

(75) Inventors: Wayne E. Richards, La Mesa; James W. Schafer, San Diego; Lloyd E. Landen, Ramona, all of CA (US)

(73) Assignee: Cubic Defense Systems, Inc., San Diego, CA (US)

( * ) Notice: Under 35 U.S.C. 154(b), the term of this patent shall be extended for 0 days.

(21) Appl. No.: 09/005,181

(22) Filed: Jan. 9, 1998

(51) Int. Cl.$^7$ ................................................ H04L 27/00
(52) U.S. Cl. ........................ 375/259; 375/316; 342/450
(58) Field of Search ...................... 375/259, 316, 375/326, 327, 328, 343, 349, 350, 371, 372; 708/422, 423, 424, 425, 426, 270, 272; 342/458, 450, 462, 463

(56) References Cited

U.S. PATENT DOCUMENTS

| | | | |
|---|---|---|---|
| 3,665,464 | * 5/1972 | Meilander | 342/36 |
| 5,283,653 | * 2/1994 | Cittta | 348/725 |
| 5,315,270 | * 5/1994 | Leonowich | 331/1 A |
| 5,760,743 | * 6/1998 | Law et al. | 342/458 |

* cited by examiner

*Primary Examiner*—Don N. Vo
*Assistant Examiner*—Phuong Phu
(74) *Attorney, Agent, or Firm*—Michael H. Jester

(57) ABSTRACT

An ASIC chip interfaces with multiple data protocol specifications and includes a demodulator for data messages in a protocol at a first data rate, such as the TACTS protocol, and includes a demodulator for data messages in a protocol at a second data rate, such as the NACTS protocol. The ASIC chip is installed in a system for the transmission and receipt of data messages in the two protocols, and operates under control of a microprocessor, which selects between the available message protocols. Additional data rates and protocols beyond the first two can be accommodated. The different demodulators share processing structures that reduce the circuit components otherwise necessary for operation. This reduces the weight and power requirements of the chip. In this way, the ASIC chip provides a processing system that can operate with multiple data protocol specifications and data rates, while ensuring accurate and reliable detection of data streams in an aircraft operational environment.

8 Claims, 19 Drawing Sheets

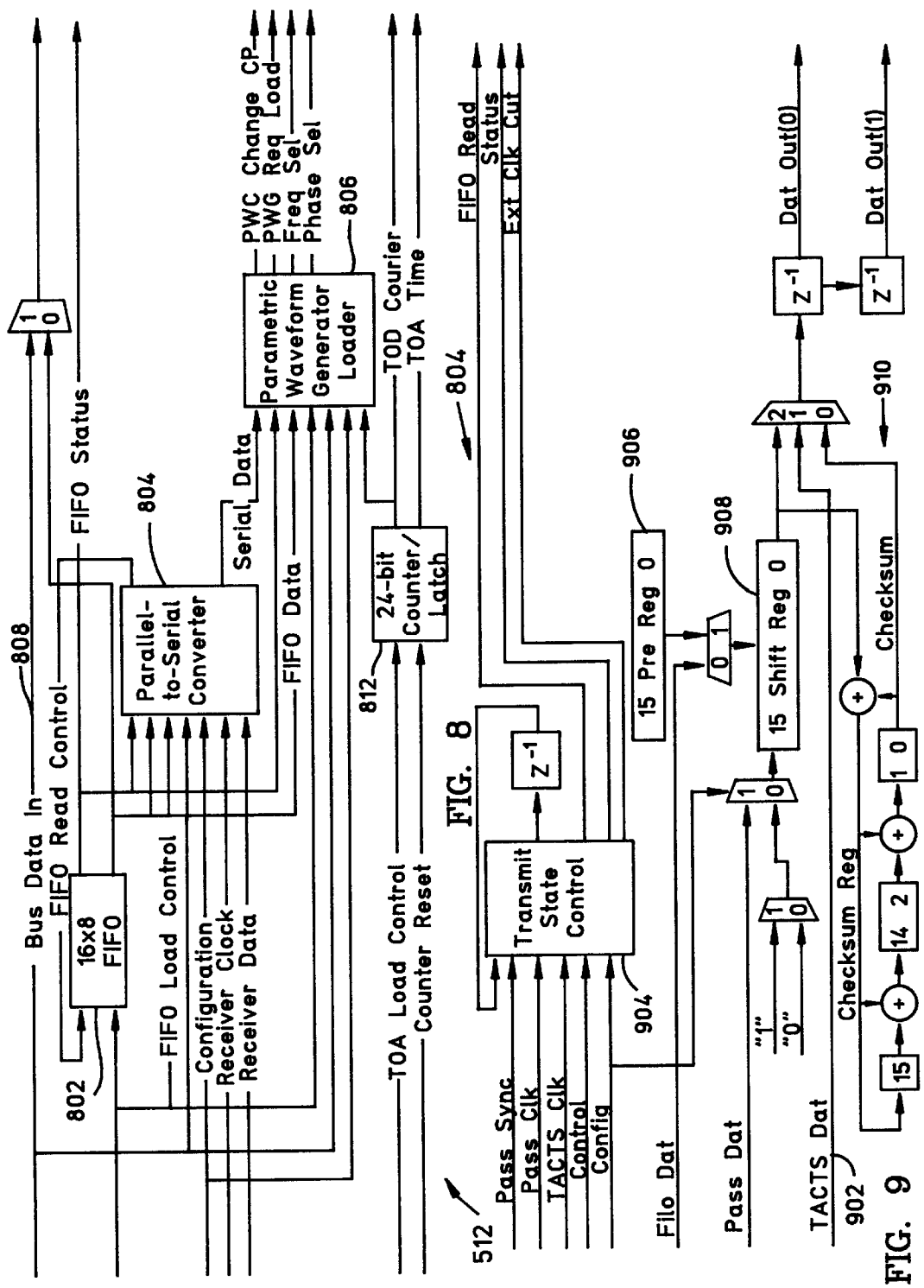

AIRCRAFT COMBAT TRAINING SIGNAL PROCESSING SYSTEM

BACKGROUND OF THE INVENTION

1. Field of the Invention

This invention relates generally to processing of radio-frequency transmitted data and, more particularly, to processing of real-time data transmitted between fixed ground stations and as mobile aircraft as part of an aircraft combat training system.

2. Description of the Related Art

Military training of aircraft combat crews involves maneuvering aircraft across specified terrain and airspace in simulated battle operations. Instrumentation mounted in the aircraft provides position information and performance data to ground-based stations, which collect the aircraft data, process it, and generate reports on likely combat effectiveness of the crews and equipment. A wide variety of aircraft operations can be simulated, including air combat and ground attack. The data processing can determine the likely effect of weapons delivery, keep track of objects being fired upon, and assess likely damage to targets and to attacking aircraft.

The instrumentation is generally carried by aircraft in pods mounted at aircraft weapons stations, and is referred to as Air Combat Maneuvering Instrumentation (ACMI). One well-known instrumentation specification and data protocol, used by the armed forces of the U.S.A., is referred to as Tactical Air Combat Training System (TACTS). Data in TACTS is transmitted at the rate of either approximately 62 kilobits per second (KBPS) or 198.4 KBPS. The TACTS data includes aircraft identification and operational data such as weapons load and remaining fuel. The digital data is modulated and mixed with a carrier frequency for transmission over the radio frequency (RF) band.

The TACTS data transmitted by an aircraft permits aircraft position to be derived by a process known as multilateral triangulation. In multilateral triangulation, an aircraft receives data from a ground station and transmits data to multiple ground stations. The range (straight-line distance) from the aircraft to any one of the ground stations is determined by measuring the phase of a sinusoidal signal modulated onto a carrier frequency received and re-transmitted by the aircraft. Range data from any three ground stations will determine the aircraft position in terms of latitude, longitude, and altitude.

The speed of the aircraft involved in ACMI systems can vary greatly, from zero (hovering speeds) in the case of helicopters to hundreds of miles per hour in the case of supersonic aircraft. The ACMI ranges cover many square miles of land and the altitudes involved can vary from ground level to tens of thousands of feet. All of the data must be transmitted, received, collected, and processed in real time. This presents a very demanding signal processing task to ensure accuracy and reliability. The TACTS specification has been in use since approximately the 1970s.

A system having greater data transmission capability has been proposed for use at the military range located at Nellis Air Force Base, Nevada, U.S.A. The new system is called Nellis Air Combat Training System (NACTS) and specifies data transmission at the rate of 1.44 megabits per second (MBPS), or 1440 KBPS. Because of the advent of systems such as the Global Positioning Satellite (GPS) system, the NACTS protocol does not rely on multilateral triangulation for determining aircraft position. As with the TACTS implementation, the NACTS data is transmitted from pods attached to aircraft and relayed to ground stations, where the data is processed. The increased data rate of NACTS can support, for example, an increased number of aircraft participating in any training exercise or an increased amount of data transmitted for each aircraft.

As noted above, the TACTS specification has been in use for many years. Many training facilities have used, and will continue to use, the TACTS specification. Thus, it would be advantageous if an ACMI pod for use with training systems could support both the TACTS and NACTS specifications. A characteristic of continuing importance is the accurate detection of received data and, in particular, the identification of data pulses. Efficient construction and operation, in the form of low weight and low power requirements, also is important so as to minimally impact aircraft operation.

From the discussion above, it should be apparent that there is a need for a processing system that can operate with multiple data protocol specifications, waveforms, and data rates, while ensuring accurate and reliable detection of data streams in an aircraft operational environment. The present invention fulfills this need.

SUMMARY OF THE INVENTION

The present invention provides an application specific integrated circuit (ASIC) chip that can interface with multiple data protocol specifications. The ASIC includes a demodulator and modulation generator for data messages in a protocol at a first data rate, such as TACTS, and includes a demodulator and modulation generator for data messages in a protocol at a second data rate, such as NACTS. The ASIC chip is installed in a system for the transmission and receipt of data messages in the two protocols, and operates under control of a microprocessor, which selects between the available message protocols. Additional data rates and protocols beyond the first two can be accommodated. The different demodulators share processing structures that reduce the circuit components otherwise necessary for operation. This reduces the weight and power requirements of the chip. In this way, the ASIC chip provides a processing system that can operate with multiple data protocol specifications and data rates, while ensuring accurate and reliable detection of data streams in an aircraft operational environment.

In one aspect of the invention, the ASIC chip includes a demodulator for the first protocol (TACTS) with a data clock recovery circuit that permits precise phase alignment of the demodulator clock with the clock of the data generating device, such as the aircraft. This demodulator permits quicker response, better immunity to noise, and better signal updating as new sample data is received.

In another aspect of the invention, the ASIC chip includes a demodulator for the second protocol (HDR) with a digital correlator that acts as a matched filter to quickly and accurately detect a message preamble, and a carrier phase tracking circuit to more precisely track the carrier phase for signals under consideration. In particular, a predetermined number of prior signal samples is summed to form a carrier reference signal. The dot product of the reference with the next incoming data sample of the signal is checked to determine if the sample should be characterized as in phase or out of phase with the reference.

In yet another aspect of the invention, the ASIC chip includes a dual function transmit path digital interpolator (DI) that is used as an interpolator for range measurement functions and then also functions as a parametric waveform generator when transmitting pulse waveform data. The interpolating filter is implemented as a Hogenauer filter that is less complicated than conventional finite impulse response (FIR) filters typically used for interpolation filtering, and uniquely permits dual use as a waveform generator. The dual use feature provides improved performance with simplified structure and reduced weight.

In another aspect of the invention, the ASIC chip includes a digital correlator that more accurately estimates the time of arrival of a pulse signal. This is particularly useful when the ASIC chip operates in a pulse position modulation mode, in which data messages comprise only predetermined pulse waveforms such that a delay interval between consecutive pulse waveforms comprises pulse position modulation data. In the pulse position modulation mode, a vector summer determines when a peak sample value of a data message sample occurred, and a counter register stores a count representing the local time of arrival of each peak sample value, such that the host processor can then calculate the elapsed time between sample peak sample values and thereby accurately determine the data represented by the delay interval between two pulse waveforms. The second demodulator shares some computing components with the first demodulator and thereby increases efficiency. In addition, the digital correlator permits capturing correlation values near the peak of correlation and making them available to the host processor where the time of arrival (TOA) estimate can be refined to much finer than one clock cycle time. Thus, the TOA estimate can be determined to a resolution finer than that of the system clock. This permits precise TOA measurements without the complexity of very high speed sampling.

In yet another aspect of the invention, fine timing adjustments are made when chirp pulse waveforms are generated as part of a ranging function in which a time delay must be inserted between the time when a pulse is received and the time when the pulse is retransmitted. Such timing adjustments permit a receiving chip to determine a message delay interval with an apparent fidelity that is greater than the actual transmit clock of the transmitting ASIC chip. This is achieved by adjusting the starting frequency of the chirp pulse waveform, using the programmable parametric waveform generator of the ASIC chip and the host processor interface.

Other features and advantages of the present invention should be apparent from the following description of the preferred embodiment, which illustrates, by way of example, the principles of the invention.

BRIEF DESCRIPTION OF THE DRAWINGS

FIG. 8 is a representation of the processor interface signal-transmitting data path.

FIG. 9 is a representation of the parallel-to-serial converter in the transmit data path illustrated in FIG. 8.

DESCRIPTION OF THE PREFERRED EMBODIMENT

Figure 1:
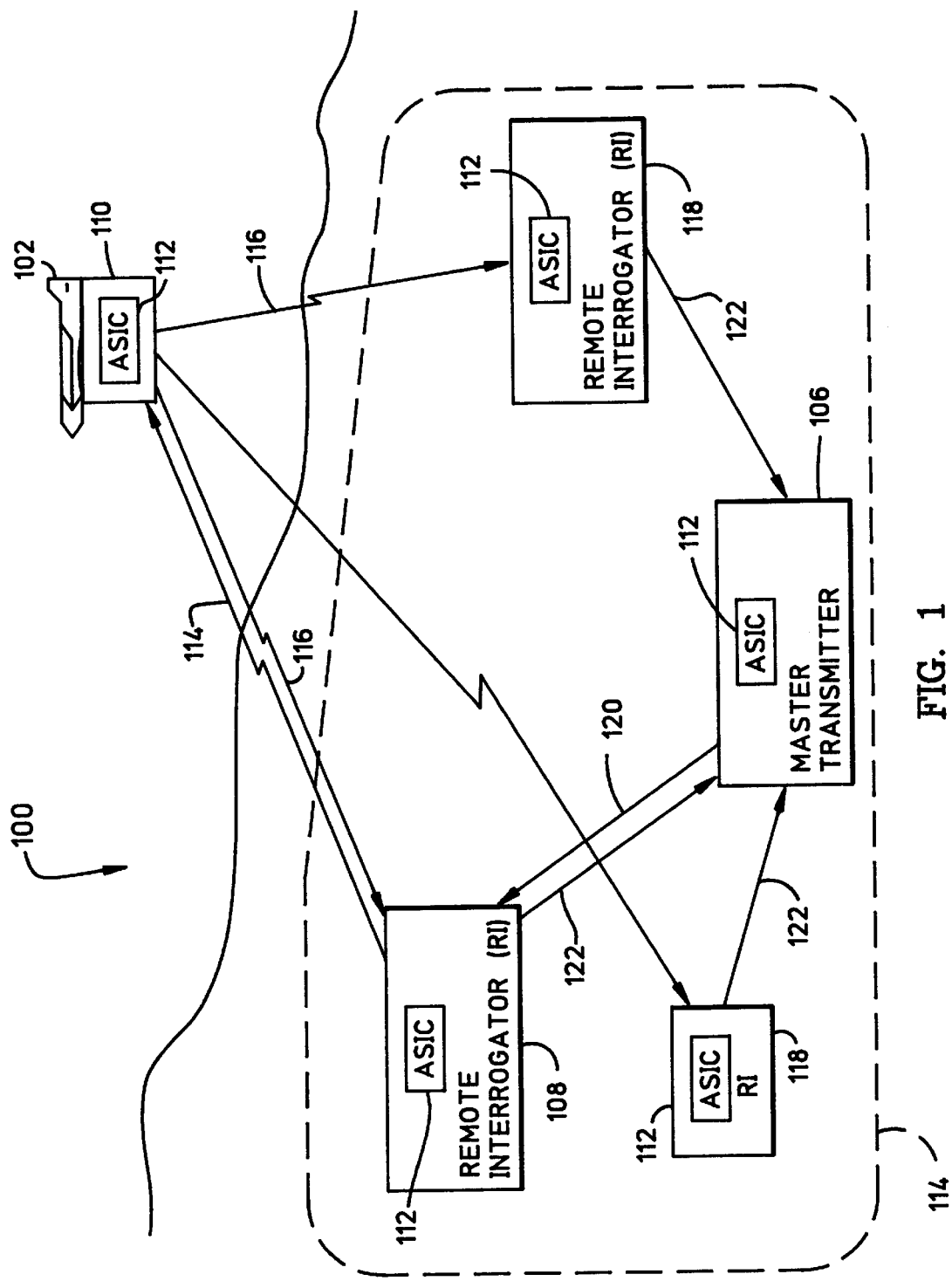
FIG. 1 is representation of a combination TACTS/NACTS system constructed in accordance with the present invention, showing a master transmitter, remote interrogator, and an aircraft, each of which includes an ASIC chip that processes both TACTS and NACTS data.

FIG. 1 illustrates an exemplary portion of an air combat maneuvering instrumentation (ACMI) system 100 constructed in accordance with the present invention. One or more aircraft 102 fly over a test range 104 on which are located a master transmitter station 106 and multiple remote interrogator (RI) stations 108, 118. The aircraft carries a pod 110 containing an application specific integrated circuit (ASIC) chip 112 constructed in accordance with the present invention that can interface with multiple data protocol specifications. In the preferred embodiment, the two data specifications comprise the TACTS standard and the higher data rate NACTS standard. Each one of the RI's, and the master transmitter, also contains an ASIC chip 112 constructed in accordance with the present invention that can interface with multiple data protocol specifications.

The aircraft 102 communicates with the RI stations 108 via an uplink path 114 from the RI stations to the aircraft and via a downlink path 116 from the aircraft to the RI stations. The master transmitter 106 communicates with all the RI stations 108, 118 using an uplink path 120 from the master transmitter to the RI stations, and using a downlink path 122 from the RI stations to the master transmitter.

The master transmitter 106 sends messages out to a selected one of the RI stations 108 and the messages are retransmitted to the aircraft 102. Typically, the master transmitter sends a fixed content message that requests an aircraft response. The master transmitter message contains a unique address for a specific RI station 108. When the intended RI station receives the message, it retransmits it to the aircraft via the uplink data path 114. When the aircraft receives the message, it broadcasts a response. All of the RI stations 108, 118 continuously monitor the downlink path 116 for messages from the aircraft, and report back to the master transmitter. Thus, all RI stations 108, 118 that receive an aircraft response message will pass the response back to the master transmitter 106.

In the TACTS protocol, the master transmitter 106 sends messages to selected RI stations and processes the aircraft response information. The aircraft response to each RI station permits the master transmitter to determine the aircraft range to that RI station. By receiving the response messages from each RI station and determining the aircraft range, the master transmitter can compare the aircraft range from any three or more RI stations and thereby precisely determine the aircraft position in terms of latitude, longitude, and altitude. This process is called multilateral triangulation. Those skilled in the art will appreciate that the global positioning satellite (GPS) system permits a similar function to be performed by a wide variety of devices to precisely determine device position anywhere on the earth.

The ASIC Chip

Figure 2:
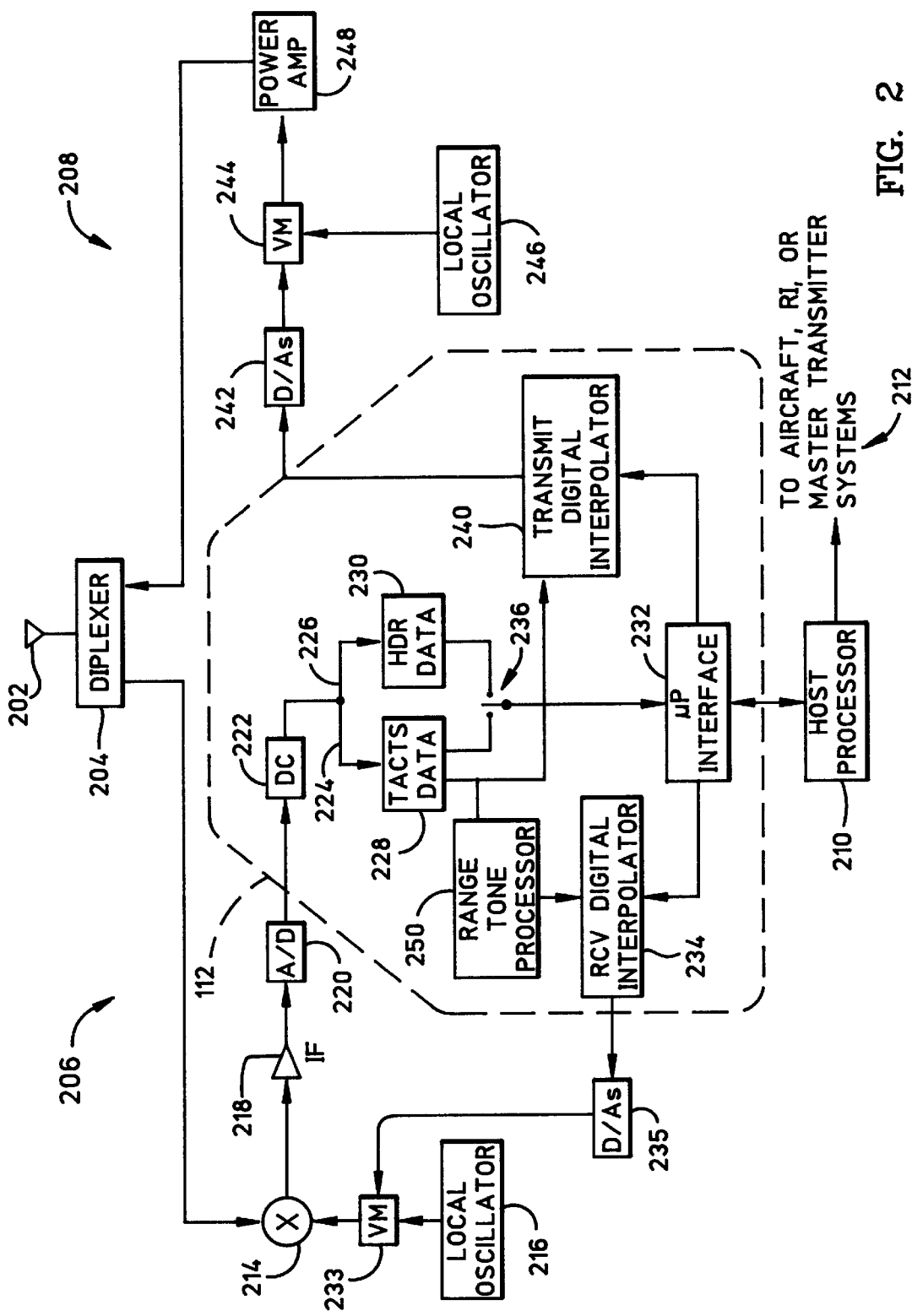
FIG. 2 is a block diagram representation of the data processing path for the master transmitter, remote interrogator, and aircraft shown in FIG. 1, including the ASIC chip

As illustrated in FIG. 1, the ASIC chip that incorporates the invention can be installed in either an aircraft-carried pod, a Remote Interrogator ground station, or the Master Transmitter ground station. FIG. 2 is a block diagram of the ASIC chip that illustrates the uplink and downlink message paths in each of these three types of installations.

Messages are sent and received through an antenna 202 connected to a diplexer 204. Downlink messages are received through a receive message path 206 and uplink messages are transmitted through a transmit message path 208. The ASIC chip 112 operates under control of a host microprocessor 210 of the particular installation, either the aircraft pod, RI station, or Master Transmitter station. Thus, the host microprocessor 210 interfaces to appropriate systems 212 of the corresponding installation.

In the receive message path 206, a message is provided from the diplexer 204 to a mixer 214, where it is mixed with a signal generated by a local oscillator 216 to remove the transmission carrier frequency and produce a received signal having an intermediate frequency. In particular, the message signal from the diplexer 204 has a frequency of approximately 1800 MHz and the signal from the mixer 214 has a frequency of approximately 52 MHz. From the mixer, the received signal is provided to an intermediate frequency amplifier 218 and then to an analog-to-digital (A/D) converter 220. The resulting digital data signal enters the ASIC 112 and is provided to a downconverter 222.

From the downconverter 222, the data signal is provided to two different data paths 224, 226. One data path 224 is provided for the TACTS message protocol and the other data path 226 is provided for the high data rate (HDR) data of the NACTS message protocol. Other message protocols can be accommodated, as desired. The TACTS data is processed by TACTS data components 228 and the HDR data is processed by HDR data components 230. The components for processing the data in each of these data paths will be described in greater detail below.

The microprocessor 210 of the installation station controls which data processing path is used, either TACTS or HDR. That is, the ASIC chip 112 services the microprocessor and is under its control. The details of determining which data processing path to select will be known to those skilled in the art and does not form a part of the ASIC chip operation.

The microprocessor 210 controls the operation of the ASIC chip 112 through a microprocessor interface 232, which comprises multiple registers that determine the operation of the other blocks, such as the receiver digital interpolator (DI) 234. The ASIC chip registers determine operation of the ASIC chip by triggering different logical operations depending on the register values, in accordance with stored program steps. In this way, the registers of the microprocessor interface act like a switch 236 that selects between the TACTS data path 224 and the HDR data path 226.

The output of the receive DI 234 is provided to two digital-to-analog (D/A) converters 235, whose outputs in turn phase modulate the LO 216 output using a vector modulator 233. It should be noted that the receive DI also receives TACTS data through the microprocessor interface 232. Thus, the demodulated message received through the antenna 202 is ultimately received through the registers of the microprocessor interface 232 and from the interface they are processed by the installation microprocessor 210 to perform tasks associated with the air combat training range (see FIG. 1), such as determining aircraft position and speed.

In the transmit message path 208, a message from the microprocessor 210 is provided to the microprocessor interface 232, and is then directed to a transmit path digital interpolator 240. From the transmit interpolator, the signal is provided to two digital-to-analog (D/A) converters 242 and then to a vector modulator 244, where it is modulated onto a signal generated by a local oscillator 246 to add a transmission carrier frequency and produce a transmitted signal having modulation. In particular, the message signal from the interpolator and D/A converters has its energy in baseband (0–2 MHz) and the signal from the vector modulator 244 has a frequency of approximately 1800 MHz. From the modulator, the transmitpath signal is provided to a power amplifier 248 and then to the diplexer 204, where it is directed to the antenna 202 and transmitted to appropriate stations of the system 100 (see FIG. 1).

Operation of the Installed ASIC Chip

Figure 3:
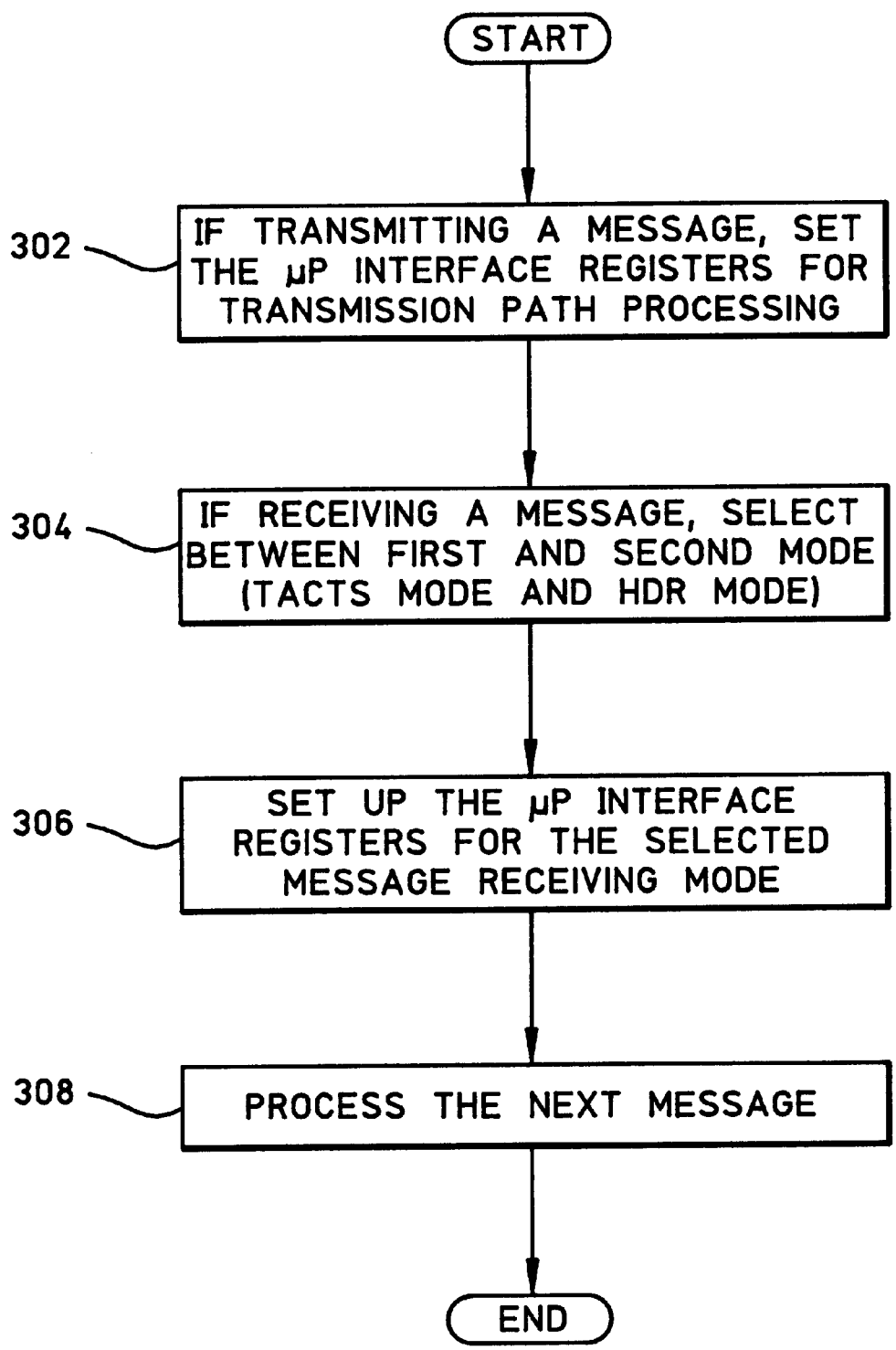
FIG. 3 is a flow diagram of the operating steps performed by the ASIC chip illustrated in FIG. 2.

FIG. 3 is a flow diagram that illustrates the operating steps performed by the microprocessor as it controls the ASIC chip in an installation. The microprocessor must first select between transmitting and receiving modes of operation. In the FIG. 3 flow diagram, the transmitting mode is selected first, but the order can be reversed. Accordingly, FIG. 3 shows that the first step for the microprocessor to determine if the transmitting mode is desired and, if so, to select the microprocessor interface register values appropriate for this mode. This operating step is represented by the FIG. 3 flow diagram box numbered 302.

The next step, represented by the flow diagram box numbered 304, is for the microprocessor to determine if the receiving mode is desired and to select between the first protocol, the TACTS mode, and the second protocol, the HDR mode. Next, the microprocessor sets the microprocessor interface register values appropriate for the selected mode, either TACTS or HDR. This operating step is represented by the flow diagram box numbered 306. Finally, the microprocessor processes the next message, either a receive message or a transmit message, as indicated by the flow diagram box numbered 308.

Top Level Block Diagram of the ASIC Chip

Figure 4:
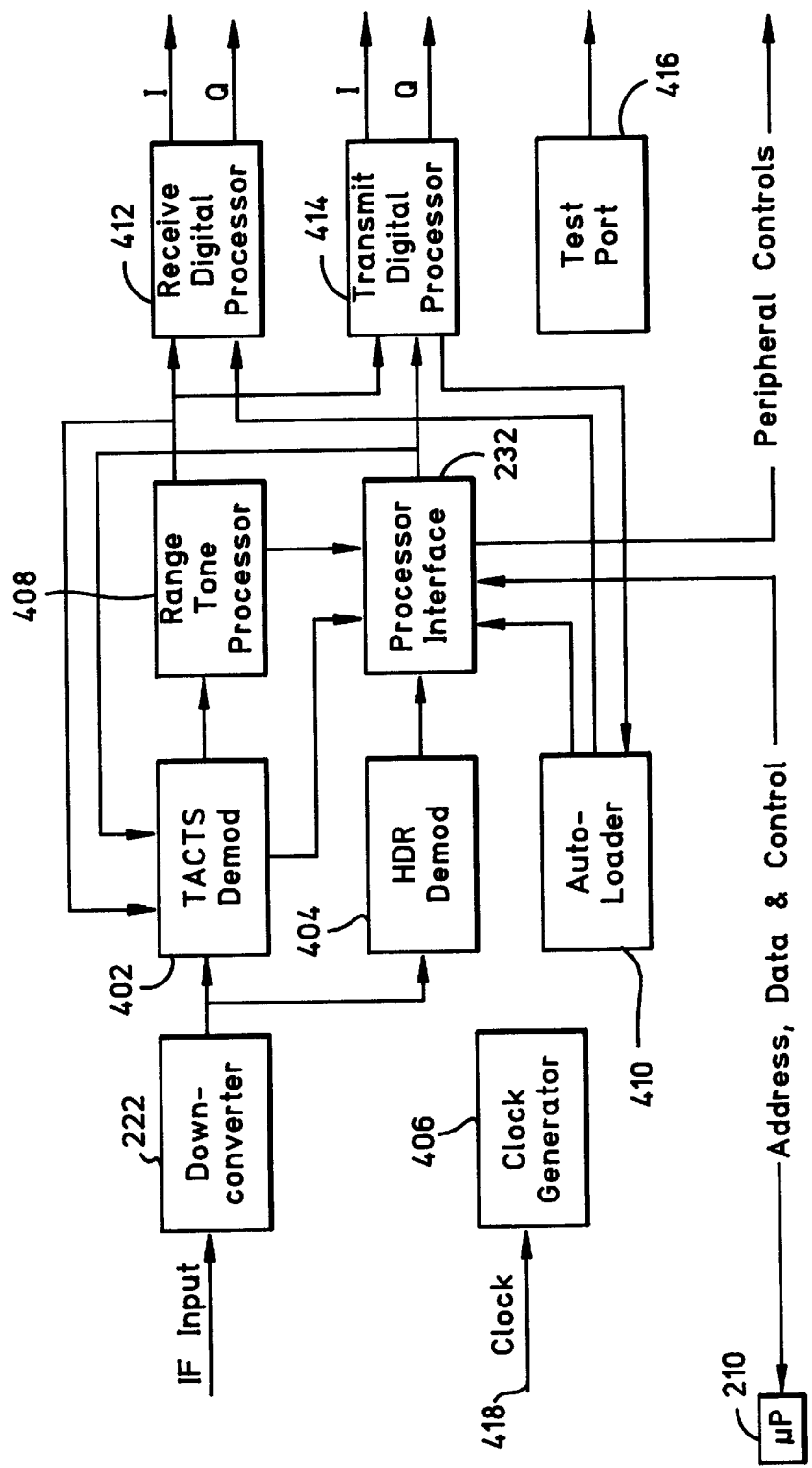
FIG. 4 is a top-level block diagram of the major components of the ASIC chip illustrated in FIG. 2.

FIG. 4 is a top-level block diagram of the ASIC chip 112 (FIG. 1) as installed in any of the components shown in FIG. 1, either the aircraft pod, the remote interrogator (RI) station, or the master transmitting station. FIG. 4 shows that, in the receive message path 206 (FIG. 2), the intermediate frequency (IF) data received at the analog-to-digital converter 220 (FIG. 2) is passed to the downconverter 222. The data from the downconverter is provided to a TACTS demodulator 402 and to a high-data-rate (HDR) demodulator 404.

The TACTS demodulator 402 processes data at the TACTS specification data rate, at either 62 KBPS or 198.4 KBPS. The HDR demodulator 404 processes data at a higher data rate, and in the preferred embodiment processes data at the NACTS data rate of 1.44 MBPS. As described further below, however, the HDR demodulator is fully configurable to support multiple data protocols and data rates, including minimum shift key (MSK) data, binary shift key (BPSK) data, differential phase shift key (DPSK) data, quadrature phase shift keyed (QPSK) data, offset quadrature phase shift key (OQPSK) data, frequency shift key (FSK) data, and pulse position modulation. The HDR demodulator therefore can process a wide variety of waveforms, either non-coherently, differentially, or coherently, as appropriate.

The clock generator 406 receives a system clock signal over a signal line 408. The clock signal is generated by the microprocessor 210 of the installation and is used system-wide. Thus, it should be understood that the clock signal is available to every one of the block components shown in FIG. 4, including the TACTS demodulator 402 and the HDR demodulator 404. The TACTS demodulator provides its data to a range tone processor 408 and the processor interface 232. The TACTS demodulator also receives data back from these two components, as described further below. The HDR demodulator provides its data to the processor interface.

As noted above, the microprocessor of the installation, whether the ASIC chip is installed in an aircraft pod, RI station, or master transmitter station, controls the chip operation by setting register values. This is indicated in FIG. 4 by the address, data, and control path from the microprocessor to the processor interface block 232. Thus, the TACTS demodulator 402, range tone processor 408, HDR demodulator 404, microprocessor 232, and an autoloader 410 all set register values and thereby provide input to the processor interface block 232. The autoloader 410 permits loading of register values without direct host processor intervention. Lastly, the processor interface sets peripheral controls, such as input/output and display. The processor interface 232 provides output to a receive digital interpolator 412 and to a transmit digital interpolator 414. Both of these interpolators generate output data referred to as "I" and "Q", respectively. A test port 416 is provided for troubleshooting and error checking.

Host Processor Interface

Figure 5:
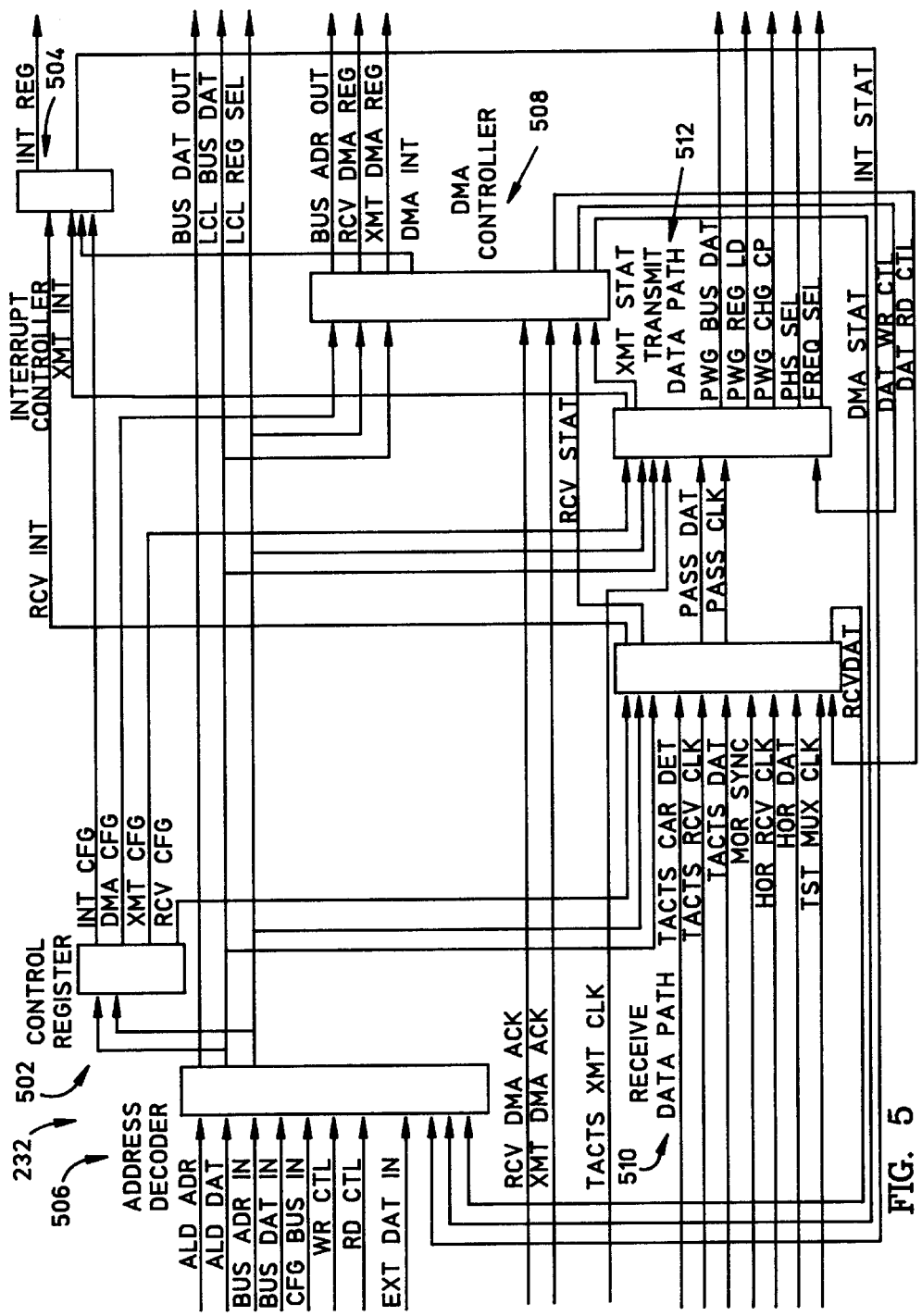
FIG. 5 is a detailed block diagram of the Processor Interface block of the ASIC chip illustrated in FIG. 4.

The processor interface 232 is shown in greater detail in the FIG. 5 block diagram, which shows that the processor interface is an interface between the host processor and memory on an ISA-type bus and all the ASIC chip configuration registers and status buffers. The ASIC chip is provided with a 24-bit address bus, a 16-bit data bus and two direct memory access (DMA) channels. In total, the ASIC chip has 133 configuration, control, and data registers. The ASIC chip includes a control register 502, an interrupt controller 504, an address decoder 506, a direct access memory (DMA) controller 508, and a group of data lines comprising a receive data path 510 and a transmit data path 512.

The fifteen-bit Select Address inputs locate the ASIC chip within the 16 MB address space of the ISA bus. The upper ten bits set the basic address for as many as 31 chips and map to the address bus pins, chip pins fourteen through twenty-three. The lower five bits of the Select Address data set the local address of each ASIC chip relative to the base address. These bids map to address bus pins, chip pins nine through thirteen. The local base address of zero is a special purpose address that is the global address to all chips within the local address range. This is a write-only address range that enables a host processor to simultaneously initialize every local chip with common configuration data. Although the ISA bus is a byte or word addressable bus, the chip only expects 16-bit operations. Therefore, the programmer is responsible for accounting 16-bit operations only.

The microprocessor interface 232 has two direct memory access (DMA) channels. These channels may be operated either with an external DMA controller or with a built-in DMA controller. When using an external DMA controller, one DMA channel is dedicated to the receive path and the other DMA channel is dedicated to the transmit a path. When using the internal DMA controller, the receive DMA channel arbitrates for use of the bus. The internal DMA controller also has a programmable base address that is common for both transmit and receive channels. Each channel has an address range of approximately 4 kilobytes (KB). In either mode, each DMA channel must be programmed with the number of words in each message.

Both the TACTS and HDR data paths process block oriented (burst mode) messages. The message format is a group of 16-bit words preceded by a preamble pattern followed by a 16-bit checksum pattern. Depending on the programming employed with the ASIC chip, the chip can be made to operate with the transmitter and receiver of the installation system operating independently of each other, or with the transmitter synchronized to the receiver. When programmed to operate independently, the ASIC chip processes and routes both the transmit and receive data through the microprocessor interface. When the installation transmitter is synchronized to the installation receiver, the source of transmit data may be either the microprocessor interface, the installation receiver, or both, but in either case the message transmission does not being until the message preamble has been detected.

The Receive Data Path

Figures 6, 7:
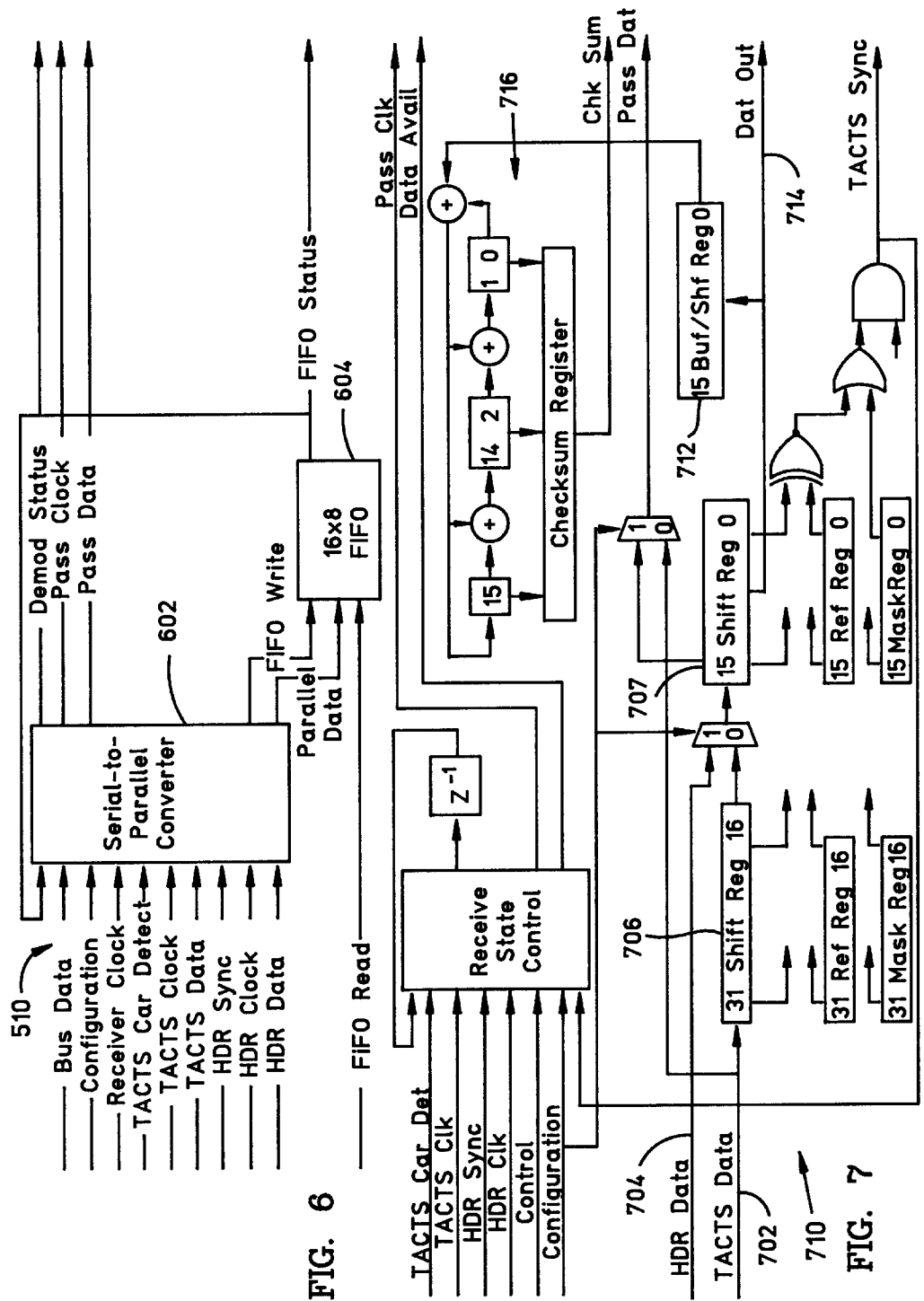
FIG. 6 is a representation of the processor interface signal-receiving data path for the ASIC chip of FIG. 4.
FIG. 7 is a representation of the serial-to-parallel converter in the receive data path illustrated in FIG. 6.

The receive data path of the processor interface 232 is shown in FIG. 6. In the receive data path, a preamble is first detected to identify the start of a message and to identify the 16-bit word boundaries in the message. In the TACTS mode of operation, the preamble search occurs in a serial-to-parallel converter 602, described further below. In the HDR mode of operation, the preamble search occurs in the HDR demodulator 404 (see FIG. 4) as the HDR correlator (described further below) searches for a particular pattern in the intermediate frequency (IF) data stream from the downconverter 222.

The Serial-to-Parallel Converter of the Receive Data Path

In the TACTS mode, the preamble pattern is detected in the serial non-return-to-zero (NRZ) data stream from the TACTS demodulator. In the serial-to-parallel converter 602, both TACTS data and HDR data are received. This is shown in greater detail in the converter block diagram of FIG. 7. The operation of the serial-to-parallel converter is controlled by the receive state control block 701.

The TACTS data is received over a TACTS data line 702 and HDR data is received over an HDR data line 704. Once the start of a message has been identified, the serial data message words are assembled in a 16-stage shift register block 706 of the converter. As soon as the shift register becomes full, its contents are transferred to a 16-bit buffer 712. If the 16×8 Receive Data first-in, first-out (FIFO) buffer 604 (FIG. 6) is available, then the data in the converter 602 is transferred in parallel from the converter to the FIFO buffer over the data out line 714 and then serially to an internal checksum generator 716.

The checksum generator data is produced by means of either a CRC-16 checksum generator or a serial 16-bit adder. The checksum generator 716 shown in FIG. 7 is depicted as a CRC-16 checksum generator. In the TACTS mode of operation, the host processor generates the checksum data as part of the message that is written to the ASIC chip. The 16-bit adder may also be used as an aid in verifying the message checksum, if desired. In the HDR mode of operation, the transmitted and received checksum protocols are compatible. When transmitting, the ASIC chip automatically appends a checksum onto the end of a message and when receiving automatically verifies the entire received message. Typically, in the HDR mode, the CRC-16 checksum generator will be used, as it is the more error tolerant checksum.

The receive data FIFO buffer 604 not only buffers received data between both of the demodulators 402, 404 and the microprocessor interface 232, but also controls checksum verification. The FIFO buffer does this by controlling the number of words processed by the checksum generator. When the FIFO buffer becomes full and stops accepting data, the checksum generator stops processing. To verify the received message, the DMA must be programmed to transfer the transmitted checksum data. This is one more word than the transmit DMA is programmed for. After all the data words in the message have been processed through the checksum generator, the receive checksum register will contain the same number as the transmitted checksum. Then, once the last word (the transmitted checksum) has been processed, the receive checksum register will contain 16-bits of zeroes, provided no errors occurred during reception.

The Transmit Data Path

The transmit data path of the processor interface 232 is shown in FIG. 8. In the transmit data path, the transmitter selects data for transmission from various sources and optionally encodes the data for the various modulation waveforms. The transmit data path can receive data from a transmit data first-in-first-out (FIFO) 802. The transmit FIFO 802 can be the same FIFO as the receive FIFO 604 shown in FIG. 6. Data from the transmit FIFO then goes to the parametric waveform generator (PWG) in the transmit digital interpolator 414. In the PPM mode, the data goes directly to the PWG. In all other modes, the data is first serialized by the serial-to-parallel converter 804 and then encoded in the PWG loader 806. The PWG loader then controls the application of coefficients in the PWG. Other message data sources include a dedicated preamble register (see FIG. 9) of the transmit parallel-to-serial converter 804 and serial sources from the receive data path 510 and dedicated external pin. The transmit data path also includes a 24-bit counter/latch 812 for receiving and producing message time-of-arrival and time-of-departure data.

The Parallel-to-Serial Converter of the Transmit Data Path

FIG. 9 shows the transmit path parallel-to-serial converter 804 in greater detail. In the converter, data is first received from the dedicated preamble register 906 and then followed by data from the transmit FIFO 802. This data is simultaneously shifted out serially to the PWG 806 with serialized data from the preamble register 908, transmit FIFO 802, transmit checksum register 910, or externally from the receive data path 510 or a dedicated external pin.

The Parametric Waveform Generator of the Transmit Data Path

Figure 10:
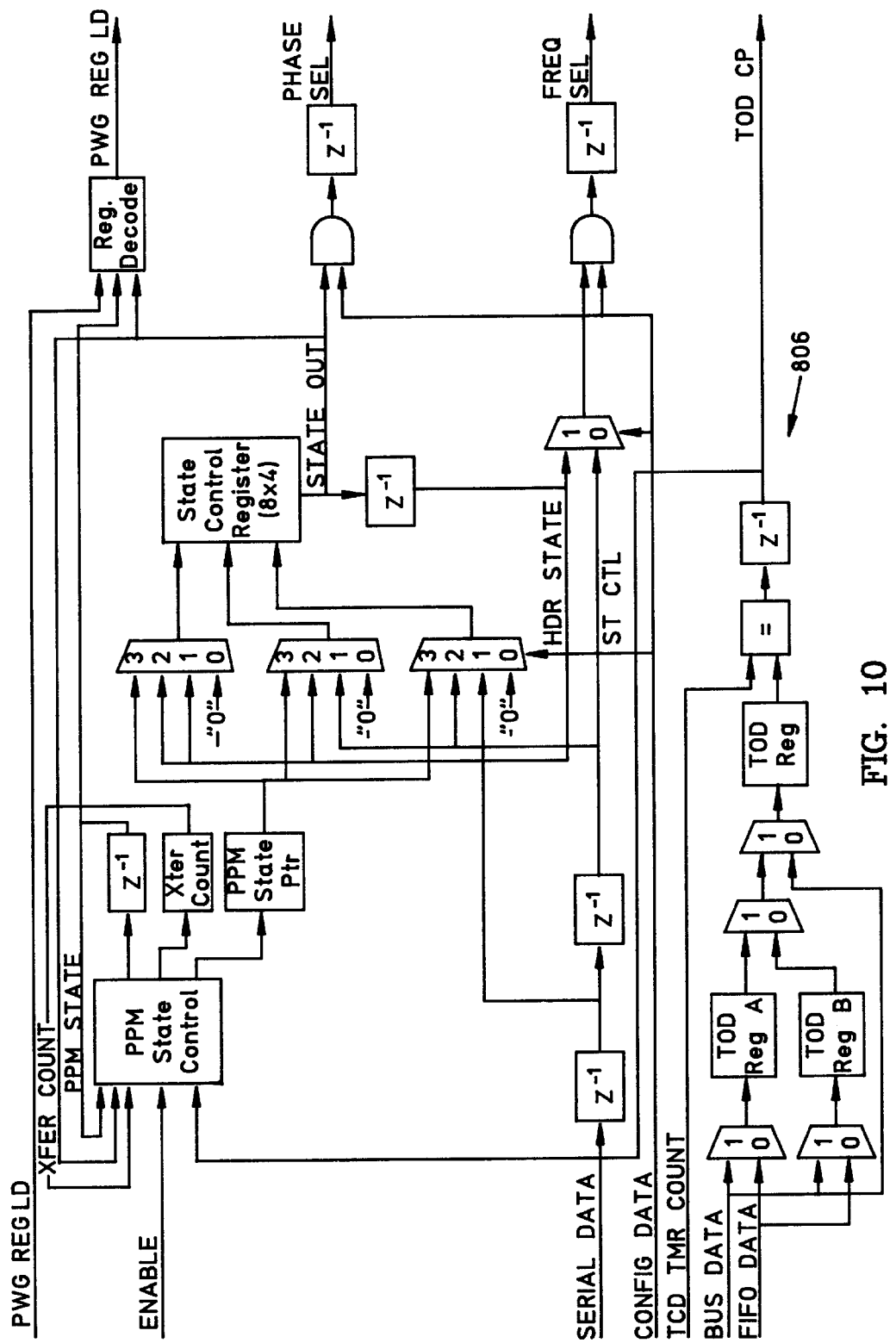
FIG. 10 is a block diagram of the parametric waveform generator loader of the transmit data path illustrated in FIG. 8.

FIG. 10 shows the parametric waveform generator (PWG) loader 806 of FIG. 8 in greater detail. The PWG loader encodes the data stream and either adds a phase shift onto the PWG output, as in the case of PSK, DPSK, QPSK, or OQPSK data, selects from a bank of coefficient registers, such as in the case of FSK, MSK data, or selects and reloads coefficient registers, as in the case of PPM data.

The Downconverter of the Receive Data Path

Figure 11:
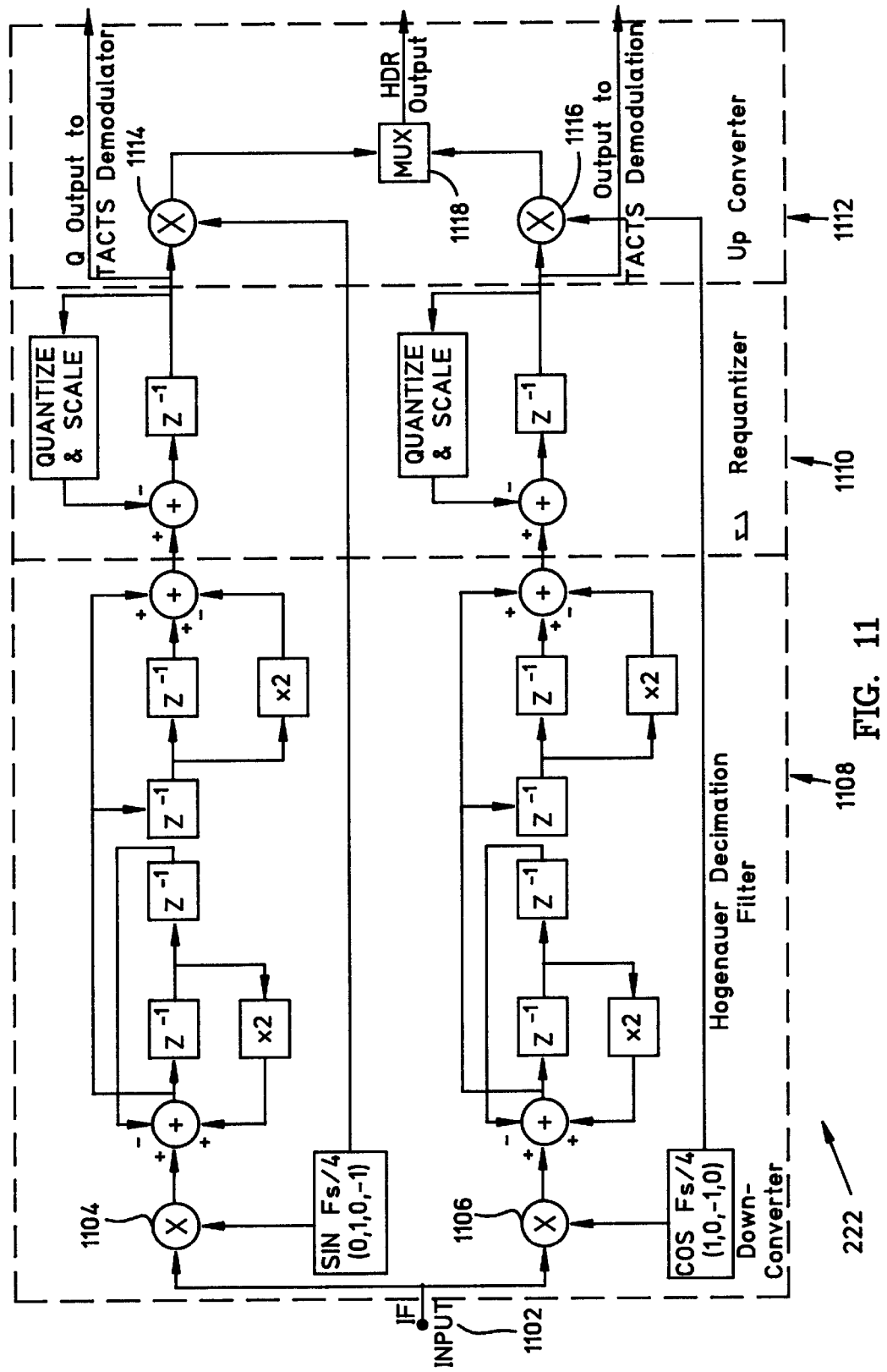
FIG. 11 is a block diagram of the downconverter shown in FIG. 4.

FIG. 2 and FIG. 3 show that a received message is converted from an analog signal at an intermediate frequency (IF) to a digital representation by a 6-bit flash A/D converter, and is then provided to a downconverter 222 of the ASIC chip. Details of the downconverter 222 are shown in FIG. 11.

In the downconverter 222, the IF frequency signal from the A/D converter 220 (FIG. 2) is received over an IF input receive signal line 1102. The IF signal is provided to two mixers, one mixer 1104 mixing the IF signal with a $\sin(F_S/4)$ signal from a signal generator 1105 and the other mixer 1106 mixing the IF signal with a $\cos(F_S/4)$ signal from a cosine generator 1107. Both mixed inputs are provided to a Hogenauer decimation filter block 1108. Parallel output streams from the sine mixer 1104 and from the cosine mixer 1106 are provided to a sigma-delta requantizer 1110 and then to an up converter 1112.

The sine mixer 1104 output stream produces a Q output stream that is provided from the requantizer output to the TACTS demodulator, and the cosine mixer 1106 output stream produces an I output stream that also is provided from the requantizer output to the TACTS demodulator. A sine output stream mixer 1114 mixes the processed output stream from the sine mixer 1104 with the signal from the sine generator 1105. A cosine output stream mixer 1116 mixes the processed output stream from the cosine mixer 1106 with the signal from the cosine generator 1107. A multiplexer 1118 combines the two mixed output streams and produces an output signal that is provided to the HDR demodulator over an HDR output line 1120.

For properly receiving message data, the center frequency of the IF signal must be near N plus or minus one-fourth times the sample rate of the data stream to be at, or alias to, one-fourth the sample rate, where N is an integer value. For example, in the case of a 23.1111 MHz sample rate, valid IF frequencies include 5.777775 MHz, 28.888875 MHz, and 51.999975 MHz. The ASIC chip converts the sampled IF signal to quadrature baseband signals and performs decimation of the sample rate by ratios of 8:1, 4:1, 2:1, or 1:1 in the Hogenauer filter. The TACTS data is processed at the 8:1 decimation ratio. To process the HDR data, the ASIC chip is programmed to use a decimation ratio that produces a sample rate (called $F_S'$) that is appropriate to the data bandwidth required. The baseband signals are then converted to a signal having an $[(F_S)'/4]$ center frequency and are processed by the HDR demodulator.

The TACTS Demodulator

Figure 12:
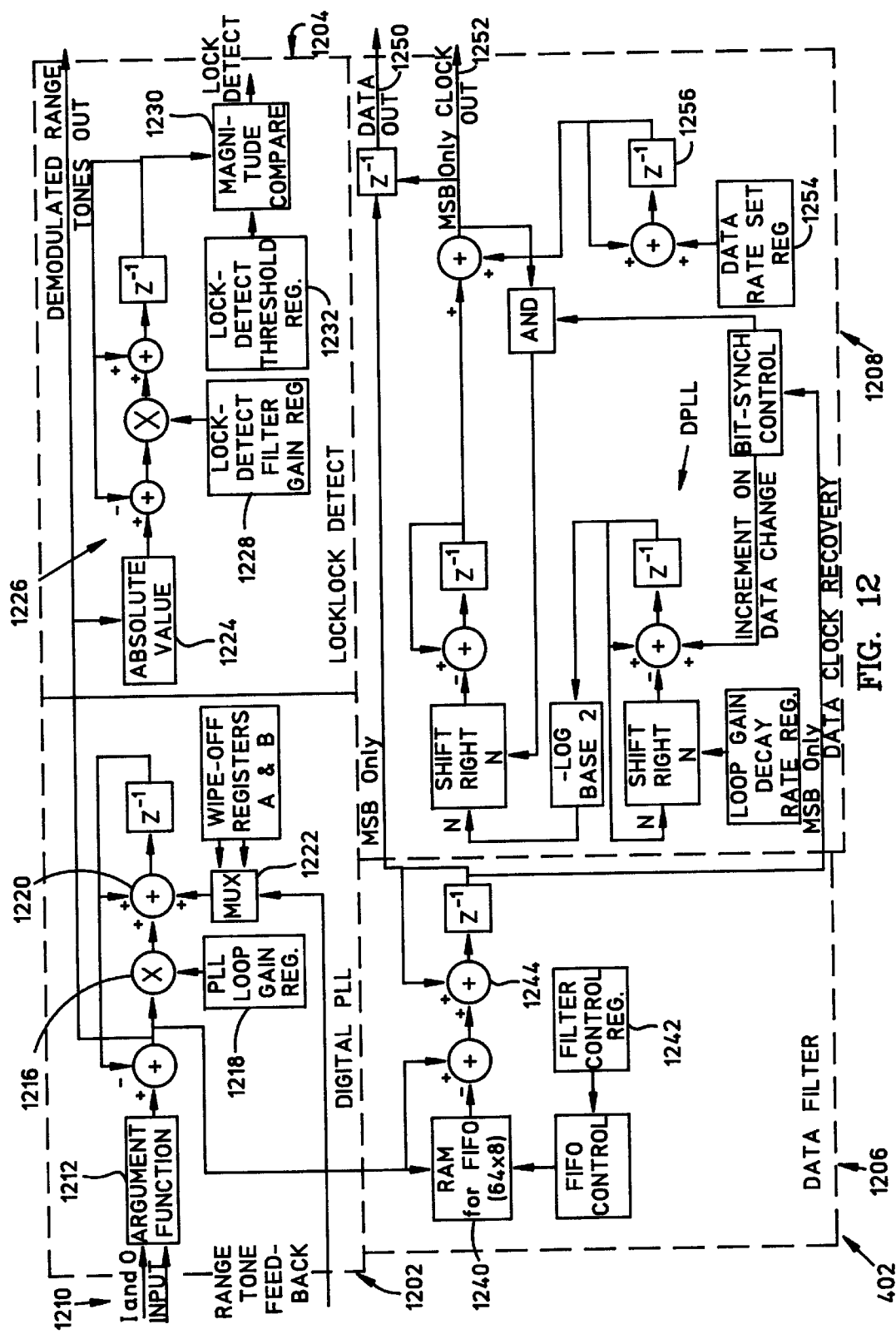
FIG. 12 is a block diagram of the TACTS demodulator shown in FIG. 4.

The TACTS demodulator 402 (FIG. 4) is shown in greater detail in FIG. 12, which shows that the demodulator includes a digital phase-lock-loop (DPLL) 1202, a carrier detection circuit 1204, a data filter 1206, and a data clock recovery circuit 1208. The DPLL is a first-order feedback circuit and has a programmable bandwidth that is nominally set to approximately 120 KHz. Most of the received data energy will be within a band of plus or minus 74 KHz, which will be within the loop bandwidth. Most of the range tone energy will occur at approximately 213 KHz, 240 KHz, or 270 KHz, which will be outside the loop bandwidth. The DPLL loop error represents the sum of demodulated data and demodulated range tones. Range tone feedback, either internal or external to the chip, reduces the composite range tone modulation index to below 0.3 radians, so that the range tones do not significantly reduce the carrier energy that the DPLL tracks.

Message data is received from the downconverter 222 (FIG. 4) in the I-Q format over input lines 1210. This message data is converted by an argument function 1212 from the I-Q format into phase angle format. These phase angles are compared to the output of an accumulator 1214 that represents the voltage controlled oscillator (VCO) of the digital phase locked loop (DPLL). The difference between the phase samples and the accumulator output is the loop phase error. A multiplier 1216 scales the loop error by a scale factor k from the loop gain register 1218 and feeds the product back into the accumulator 1214. In the preferred embodiment, the bandwidth BW set by the scale factor k is defined by the following equation:

$$BW_{3\ dB} \cong (kF_S')/(512\pi),$$

for k<<256. An adder 1220 between the multiplier 1216 and the accumulator 1214 optionally adds in range tones from the range tone processor 408 (FIG. 4) or adds in a constant from the transmit digital interpolator 414, via a multiplexer 1222. This provides an internal feedback path for range tone modulation index reduction or provides a means for removing FSK data modulation from the input message when the transmitted signal is used an a local oscillator to mix the received signal to the intermediate frequency.

The carrier detect circuit 1204 indicates the presence or absence of a carrier by looking at the average phase error from the DPLL 1202. The carrier detect circuit receives the phase error signal and obtains the signal magnitude of the phase error from an absolute value block 1224 before it passes the DPLL signal into a single pole low-pass infinite impulse response (IIR) filter. The performance of the filter can be set by a lock detect filter gain register 1228. A comparator 1230 tests the IIR filter output against a threshold value obtained from a lock-detect threshold register 1232. As noted above, the register values of the ASIC chip are set by the host microprocessor and comprise the microprocessor interface block 232 of FIG. 2.

The result of the lock detect comparison appears on a carrier lock detect signal line 1234 and also in a status register (part of the microprocessor interface 232). The signal level on the carrier lock detect line represents the state of the result, whereas the bit value in the status register represents a transition event that is indicated as either a carrier detect or a carrier loss. The carrier lock detect circuit has a programmable bandwidth BW that is defined by the following equation:

$$BW_{3\ dB} \cong (kF_S')/(8192\pi).$$

The data filter 1206 of the TACTS demodulator comprises a rectangular window, finite impulse response (FIR) low-pass filter. The data filter 1206 receives the demodulated FSK data phase errors from the DPLL 1202 and stores them into a buffer memory 1240 providing a window that may be programmed to hold from one to sixty-four eight-bit samples, where the sampling is given by $$F_S' = F_S/8,$$

making possible matched filters for data rates as low as 45 KBPS. The size of the window is set by a filter length register 1242 by the host microprocessor. The samples are provided from the memory 1240 to a filter circuit 1244. The frequency domain characteristics of the data filter 1206 are defined by a sinc function whose first null is at $F_S'/N$, where N is the number of samples in the data filter window. At a 198 KBPS data rate, the filter length is intentionally mismatched slightly to ensure that the first frequency response null falls close to the 240 KHz range tone. Serial NRZ data is available at a received (RCVD) output pin of the ASIC chip and to the microprocessor interface circuitry as the sign bit, or the most significant bit (MSB) of the data filter output. The sense (polarity) of the recovered serial NRZ data on the RCVD output is programmable.

The Data Clock Recovery Circuit of the TACTS Demodulator

The data clock recovery circuit 1208 of the TACTS demodulator recovers the data clock from the filtered phase error signal. That is, it determines the phase of the system clock with which the received message was generated. The data out signal 1250 and clock out signal 1252 are provided to the receive data path that makes the data available to the host microprocessor through the microprocessor interface block 222. In accordance with the invention, the data clock recovery circuit 1208 keeps track of the occurrences of data transitions in the received message and adjusts the phase of a reference clock as new data is received. The magnitude of adjustment is dependent on the number of clock cycles since the last transition and the number of transitions received to that point in the message.

Generally, at whatever rate data bits are being received, there are data transitions (either 0 to 1 or 1 to 0) potentially at the rate of one per data frequency reciprocal. For example, for a 200 KHz signal, a transition can be expected at a maximum of once every 5 microseconds ($\mu$sec). The TACTS demodulator, using the clock recovery circuit 1208, looks for those transitions and modifies the phase of the clock signal it is generating so it can predict where the center of the next 5 $\mu$sec bit will be.

The variable adjustment of the clock recovery circuit 1208 is made on the basis of knowing the expected data frequency and therefore the expected number of message data bits between transitions. If a run of bits are received with no data transitions (0 to 1 or 1 to 0), then the effect of the next received transition on the recovered clock value is greater than it would be if data with more frequent data transitions were received. This accounts for the timing error that can accumulate due to the differences between the receive and transmit data clock frequencies.

Returning to FIG. 12, an NCO register 1254 sets the reference data clock frequency from the host microprocessor interface (recall that the system clock output 406 is available throughout the ASIC chip; see FIG. 4). A first order DPLL 1256 then adjusts the phase offset by adding offsets to the clock output. This creates a new clock output that is phase locked to the transitions in the data stream. Each time a data transition occurs, the DPLL adjusts the phase of the tracking clock toward zero by a variable fraction of its error from zero at the time of the data transition. The scale factor applied to the correction at each transition is adjusted according to how many transitions have occurred and how long it has been since a transition last occurred. In this way, the loop gain is changed as a function of the number of data transitions detected in the sample data.

The gain starts at one for the first transition of a message, and drops as each additional bit change occurs following a 1/(N+1) sequence, where N is the number of transitions since the start of the message. To accommodate clock drift during long stretches without data transitions, the gain increases with each bit period (with or without a data transition) by a factor of $2^{-m}(1-G)$, where m is the user determined factor that sets the time constant J of the filter and G is the instantaneous tracking loop gain. The time constant J of the filter is given by the equation:

$$\tau \approx 1/(F_{Data}2^{-m}),$$

where $F_{Data}$ is the frequency of the data clock and the loop gain G is actually quantized to the nearest power of two when applied. The recovered clock signal is available on the data clock out line 1252.

The operation of the circuit 1208 is illustrated by considering the first transition of a message or of a data stream without transitions for many clock cycles. For all values of m, on the next data transition, the phase of the local clock will be adjusted to make a plus or minus 2.5 μsec change to the clock. If several clock periods have passed without a transition, for example three 5-μsec time periods, and if m=0, then the phase of the clock will change by 100% on the next transition. If m=7, then there will be an intermediate amount of adjustment at the next transition, approximately 50%. Thus, if the received transition is off from the prior clock phase by a factor of 50% and m=7, then the correction at the next transition would be 50% of 50%, or 25% in this m=7 example. This effectively averages the timing estimate from each transition, providing a more accurate estimate under noisy conditions.

If an extended period of clock cycles pass without transitions, then the DPLL has no information on which adjustments can be made. During this time, the clock frequency error may have caused a large error in the estimate of data clock phase. Therefore, when a transition is received, the circuit makes the most of the new information and will fix on the newly received data transition. Thus, more recent time information is weighted more heavily if there have not been many transitions received.

If the time constant J of the filter circuit 1208 is zero (m=0), then the circuit takes the new clock transition value as the new clock signal timing (that is, the correction factor is 100%). Therefore, in the case of J=0, it doesn't matter how recently the most recent transition (and therefore clock information) was received, the new transition is taken as valid and the clock out signal is fixed to the new transition. Those skilled in the art will recognize that this operation is different from that of a conventional phase lock loop, which takes some fixed portion of old and new data to set a new frequency. In this way, the clock recovery circuit 1208 of the invention provides an adaptive PLL.

The m value set by the user will be set considering the clock frequency uncertainty and the acceptable tracking lag due to it, and the amount of filtering required. In addition, another advantage of the clock recovery circuit 1208 is that the ASIC chip may interface to systems with reduced clock stability for the clock being used to transmit data. The ASIC chip can be programmed to adjust the m value accordingly in such conditions.

The invention provides acquisition of bit timing on the first transition of a message, and provides progressively better timing estimates with each additional transition. This estimate is performed in a nearly optimal fashion, even accounting for frequency uncertainty. The invention allows for a reduction in the message overhead dedicated to bit clock synchronization. It also is of relatively low complexity and is easily implemented in digital demodulators.

The High Data Rate (HDR) Demodulator

Figure 13:
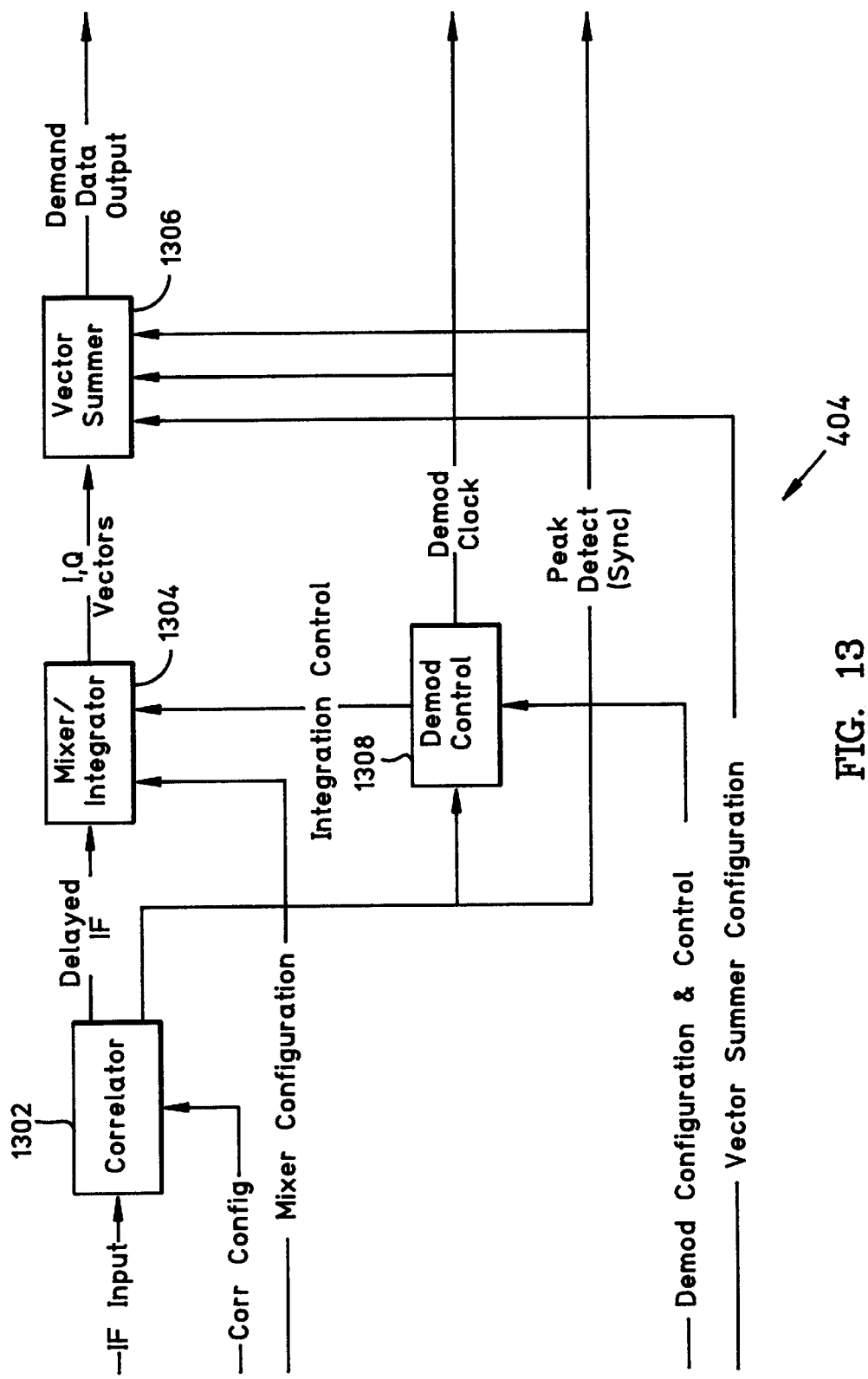
FIG. 13 is a block diagram of the High Data Rate (HDR) demodulator, for the NACTS data, shown in FIG. 4.

The high data rate (HDR) demodulator 404 (FIG. 4) is shown in greater detail in FIG. 13, which shows that the HDR demodulator includes a correlator 1302, mixer/integrator interpolator 1304, a vector summer 1306, and a control circuit 1308. The HDR demodulator of the ASIC chip can demodulate waveforms including PSK, DPSK, QPSK, OQPSK, FSK, MSK, and PPM. The correlator 1302 detects message preambles and sets timing synchronization. The mixer/integrator 1304 mixes the received IF signal to baseband and then integrates the signal for each symbol duration. The vector summer 1306 keeps track of the phase of the carrier and makes a decision as to the state of the received symbol. In particular, the HDR demodulator processes packetized data with a known message preamble, so the beginning of every message processed by the HDR demodulator will have the same pattern. The correlator 1302 is used to identify the preamble and detect the beginning of a message. Once the preamble is identified, timing information is provided to the demodulation control circuit 1308 and the rest of the message is demodulated with the mixer/integrator 1304 and vector summer 1306.

The HDR Correlator

The HDR correlator 1302 attempts to match an incoming pulse waveform to a known waveform comprising a signal of continuously varying frequency, to as accurately as possible identify the time of arrival of the incoming signal. When the incoming waveform matches the reference waveform, the correlator produces a peak detect signal. Thus, the amplitude of the correlator comparison is an indication of how closely the incoming signal matches the known waveform. Thus, the system time at which the correlator produces a peak output is used for determining the time at which the matching pulse waveform arrives Conventionally, a peak detector circuit is used to capture a clock time when a match occurs. This provides time-of-arrival information down to the resolution of the system time clock.

In accordance with the present invention, the HDR digital correlator 1302 of the ASIC chip can determine arrival time to a resolution finer than that of the system time clock. The correlator achieves this by storing correlator output signal sample values in a first-in, first-out (FIFO) pipeline register such that multiple sample values before and after a correlator threshold value are saved and provided to the host processor. The host processor can then perform post-processing to interpolate the data and determine a precise time corresponding to the correlator peak output value, and thereby precisely determine the message time of arrival.

Figure 23:
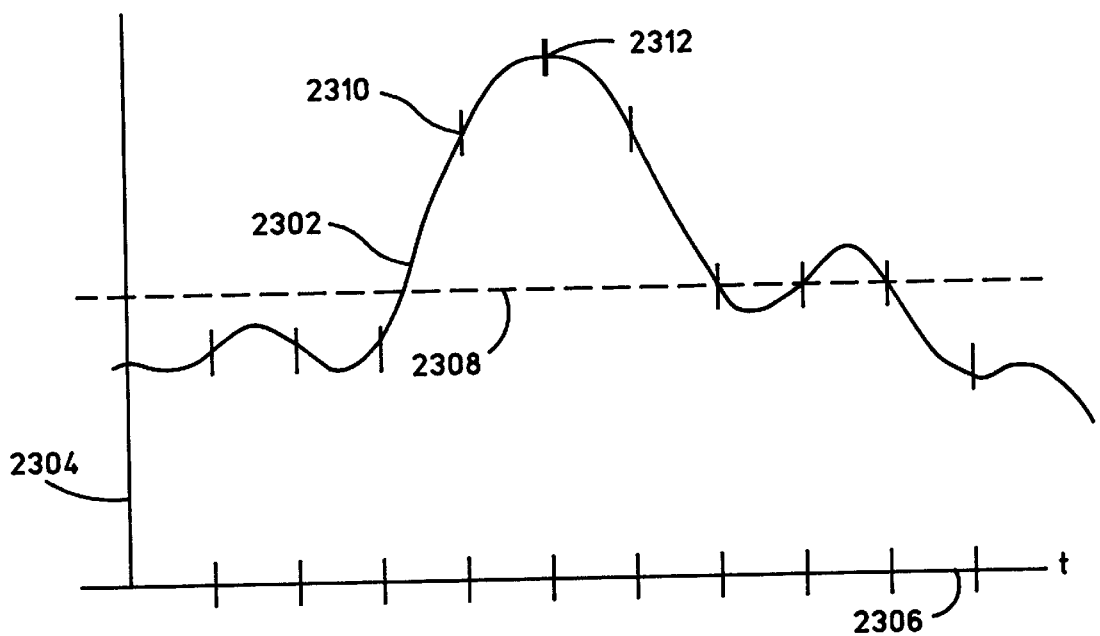
FIG. 23 is a representation of the threshold peak detection operation performed by the HDR demodulator with the vector summer illustrated in FIG. 16.

The processing of the correlator is graphically illustrated in FIG. 23, showing the output of the correlator matching function. The amplitude of the correlator matching function 2302 is shown on the vertical axis 2304, with time across the horizontal axis 2306. The system sample clock intervals are indicated across the time axis, with corresponding intervals on the correlator function graph. A dotted line 2308 indicates a threshold level that triggers the interpolation processing of the correlator. The sample values of the correlator matching function 2302 are run through the FIFO register such that, when the threshold value is crossed, multiple sample values ahead of and behind the sample value that triggered the threshold are provided to the host processor for interpolation.

Thus, a threshold-crossing sample value 2310 will trigger the saving of multiple sample values that will include a sample value 2312 nearest the actual signal peak. Those skilled in the art will appreciate that many different processing schemes can be used to very accurately determine the time along the x-axis 2306 that corresponds to the peak correlation value, given knowledge about the shape of the incoming waveform being correlated and given multiple data points along the function 2302. In the preferred embodiment, the FIFO register is a 16-sample register.

Figure 14:
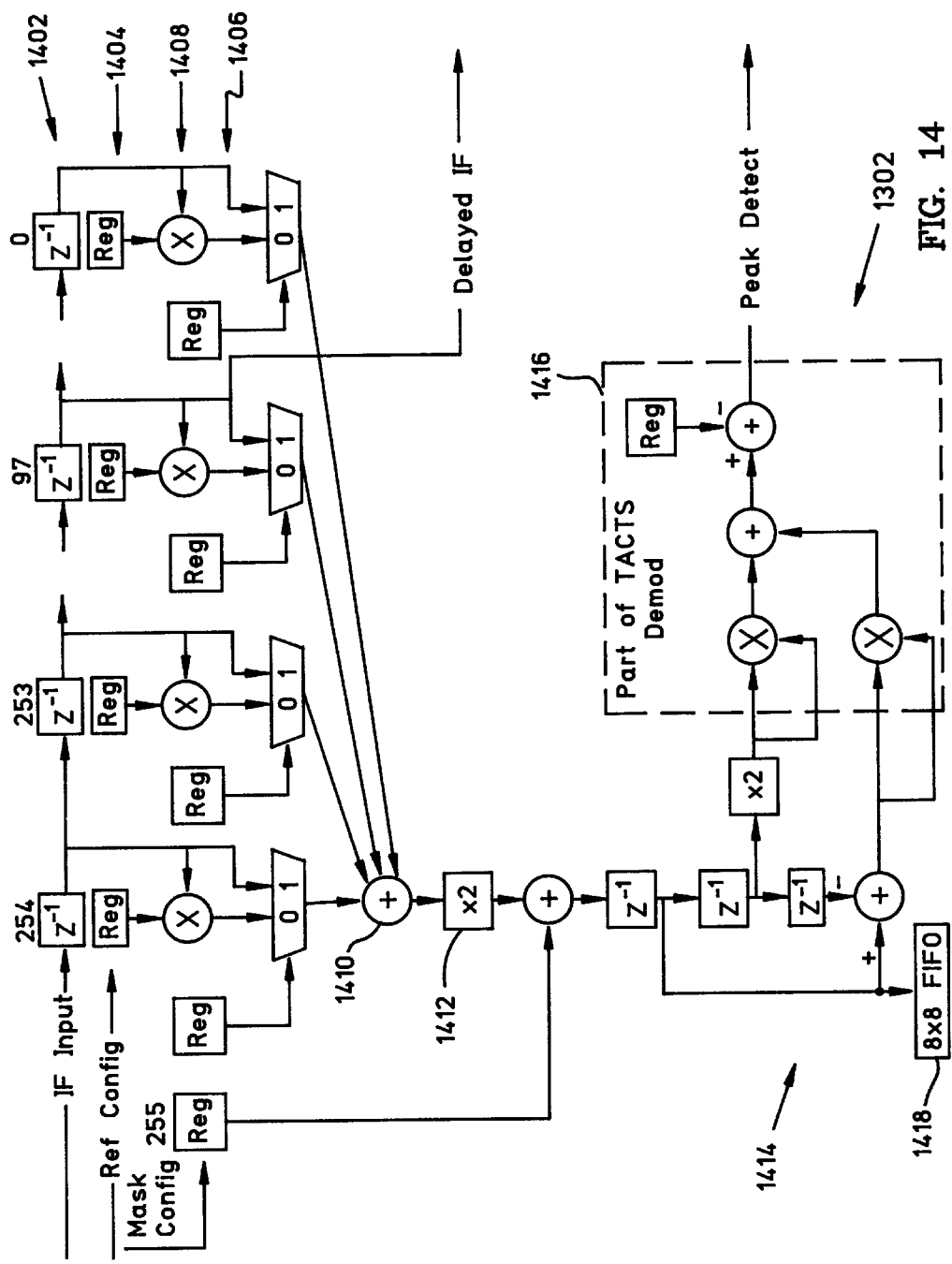
FIG. 14 is a block diagram of the HDR correlator shown in FIG. 13.

The HDR correlator 1302 is shown in greater detail in FIG. 14. The correlator receives a string of incoming signal samples into a 255-bit shift register 1402 that is connected to the IF output of the downconverter. A reference register 1404 is a 255-bit register that stores samples of the pulse waveform at the IF, quantized to one bit. A mask register 1406 is a 255-bit register of mask bits that correspond to each bit of the sample shift register 1402. A string of multipliers 1408, together with the registers 1402, 1404, 1406 provides a product function as follows:

Shift(i) XOR Reference(i) when Mask(i) is '0' (zero), and

Reference(i) when Mask(i) is '1' (one).

The function of the 256th mask and the reference bits is given by:

'0' when Mask(256) is '0', and

'½' when Mask(256) is '1'.

When the message pulse waveform is less than 255-bits in length, or if various nulls in the reference data are desired, then the unused shift register stages must be masked and one-half the masked reference bits are set to '1' and the other half are set to '0'. If an uneven number of mask bits are required, the 256th mask and reference bits must be set to '1', and otherwise are set to '0'.

An adder 1410 sums sample and reference value products, the result of which is doubled 1412. Therefore a large amplitude value is obtained when the sample waveform closely matches the reference waveform, and a lower amplitude value is obtained when the waveforms do not match. A FIFO register 1418 stores a predetermined number of summed samples (in the preferred embodiment, this is a 16×8 FIFO register that stores sixteen samples). The sample values will include the threshold trigger value and the peak correlation function value. The host processor obtains these sample values from the FIFO register via the processor interface (FIG. 4).

A filter 1414 then removes the carrier frequency otherwise present in the message data, which produces a peak signal when a message preamble is detected. In the preferred embodiment, a portion 1416 of the HDR correlator filter 1414 comprises circuit elements from the TACTS demodulator. This reduces the number of components necessary to implement the ASIC chip, thereby saving cost, materials, and weight.

In the filter 1414 of the HDR demodulator, the sum-of-products result is converted to a two's complement number by subtracting one-half the full scale range (128) and then adding the result of the 256th mask and reference bits. Two $Z^{(-1)}$ clock delay periods and a subtractor produce I, Q pairs for a magnitude comparator 1416. The I component is the first delayed result multiplied by two. The Q component is the non-delayed result subtracted by the second delayed result. The magnitude comparator computes the difference between a threshold number and the sum of the I, Q elements squared (that is, $I^2+Q^2$). The sign of the difference indicates when the pattern in the correlator shift register 1402 matches the pattern in the reference register 1404 above the amount in the threshold number, which is stored in a register.

It should be noted that, conventionally, a surface acoustic wave (SAW) filter is used to generate the peak pulse that identifies a message pulse waveform. Those skilled in the art will appreciate that a very high frequency clock is necessary in an SAW filter implementation to count the number of clock pulses between incoming message signal pulses to accurately identify time intervals and detect message pulse waveforms. The present invention permits a slower frequency clock to be used in performing message pulse waveform correlation. It has been found that accuracy of message preamble identification with the HDR correlator 1302 meets or exceeds that of conventional SAW filter correlators.

In the present HDR correlator 1302, samples of the correlator output near the time of the threshold crossing are saved and are provided to the host microprocessor. The microprocessor processes the samples to determine where the preamble signal is shifted with respect to the sample (system) clock 406 (FIG. 4). This is done by interpolating between sample points with an appropriate digital filter, which can be implemented by those skilled in the art in view of this explanation. This processing accurately indicates to the host processor the magnitude of the clock offset relative to the correlation peak. With a conventional SAW filter technique that counts clock pulses, the resolution of the correlator is to the nearest clock pulse (thus the need for the high speed clock). Thus, with a 255-sample window 1402, the correlator of the present invention can determine preamble timing to finer than one clock resolution.

Operation of the HDR Demodulator

The HDR demodulator 404 begins demodulating only after a variable delay period has elapsed beyond the detection of the preamble. The delay period is the sum of the duration for which the correlation magnitude remains above the threshold level and the value programmed into a delay terminal count register. The delay period begins when the magnitude of the correlation exceeds the threshold level and increments by one-half while the magnitude exceeds the threshold level. While the correlation magnitude is below the threshold level, the delay period is incremented by one until the delay reaches the programmed terminal delay count value. For coherent waveform demodulation, the demodulation actually begins on data within the message preamble. Although it is not produced as demodulated data output, this demodulation result initializes a carrier reference vector using the matched filter integration results and programmed bit decisions.

Figure 15:
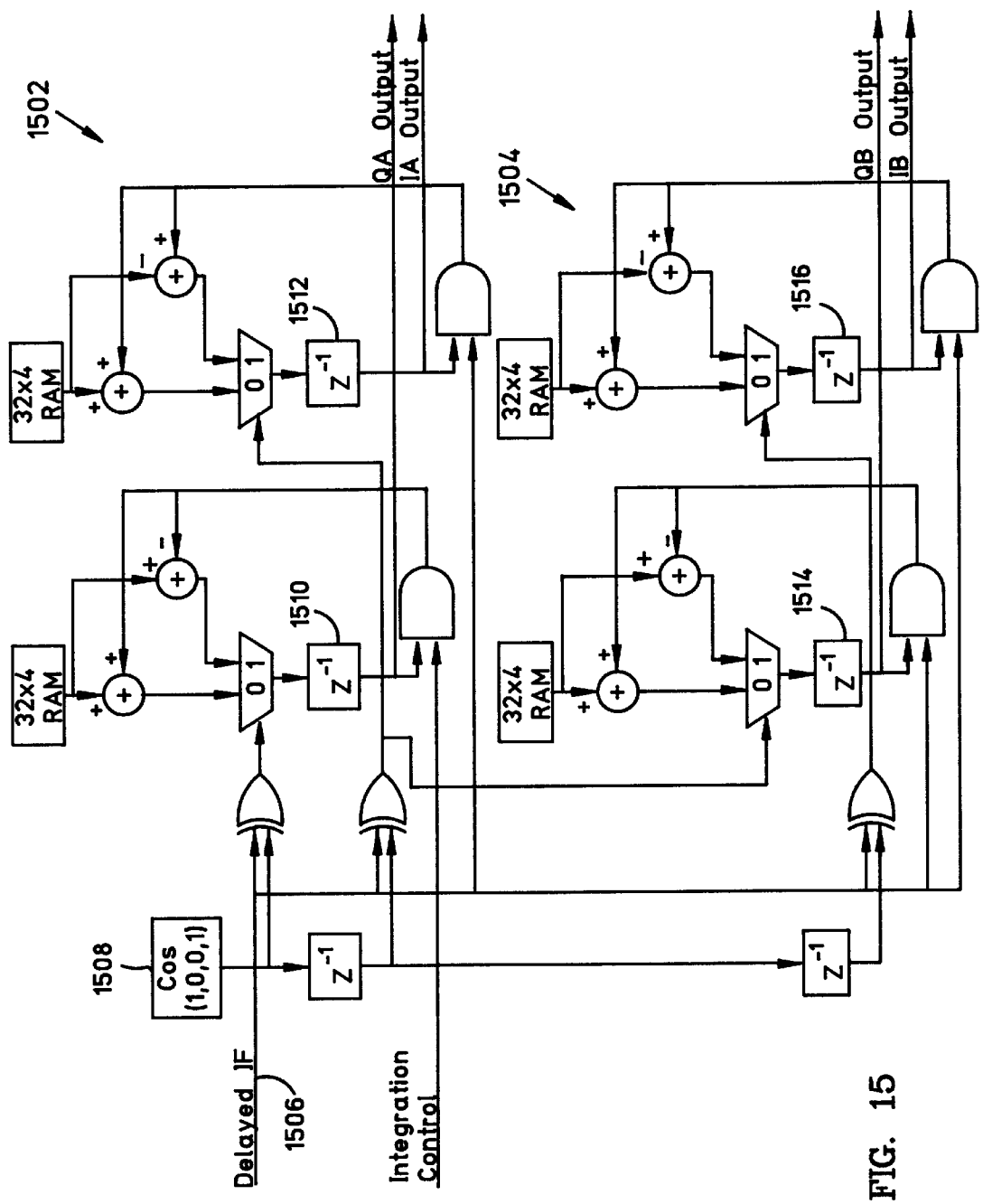
FIG. 15 is a block diagram of the HDR matched filter shown in FIG. 13.
Figure 16:
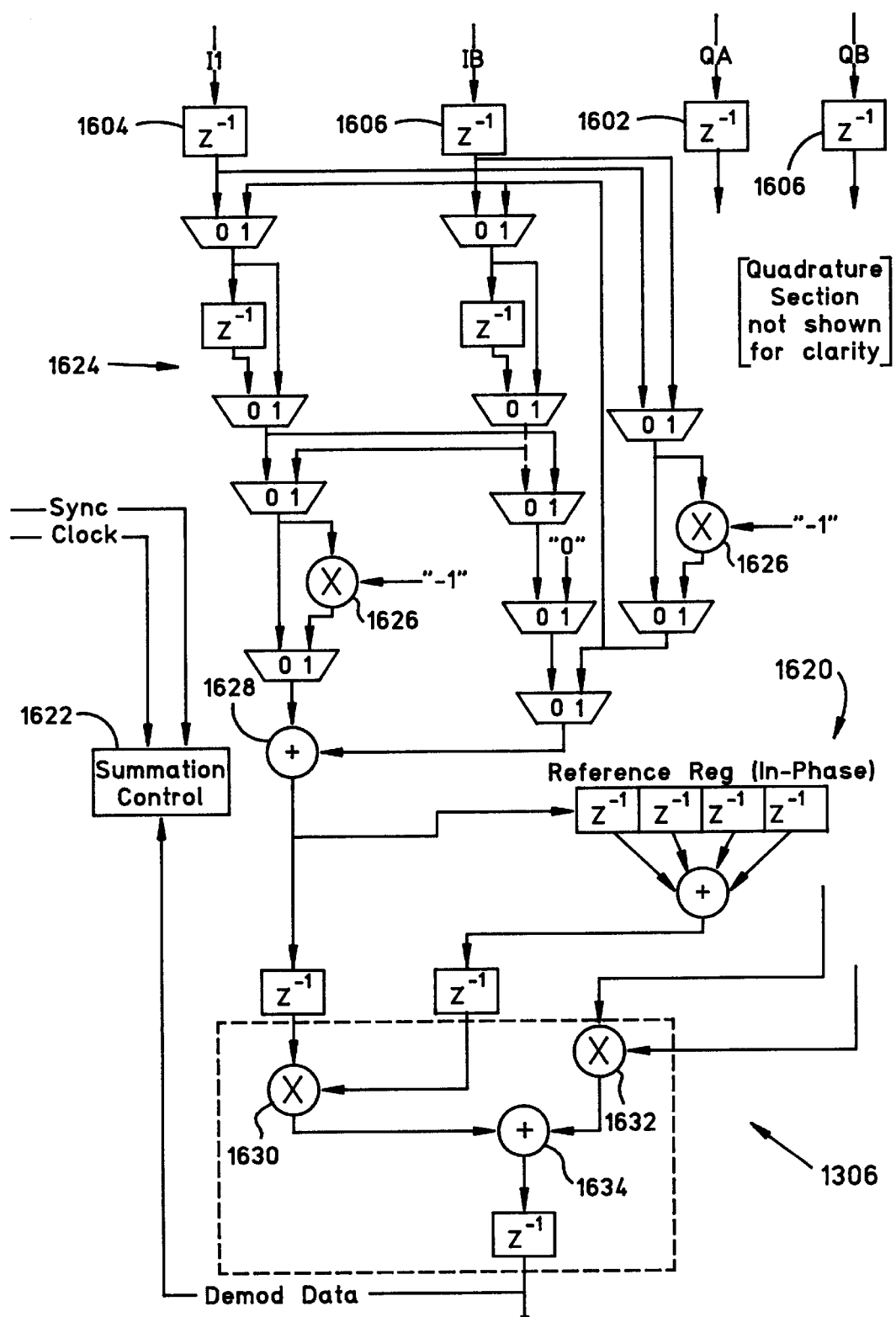
FIG. 16 is a block diagram of the HDR vector summer shown in FIG. 13.

Coherent demodulation involves comparing the vector outputs of one of two complex matched filters (shown in FIG. 15) with a complex reference vector (illustrated in FIG. 16). The filters 1502, 1504 receive the delayed IF signal from the HDR correlator over a signal line 1506. The length of each filter 1502, 1504 is the number of samples per data bit. For each of the coherently demodulated waveforms, each filter uses two reference patterns to produce the I and Q outputs. The IF signal is converted to I and Q baseband signals by mixing with the output and a delayed output of the cosine block 1508. The reference pattern matches the I and Q components of the waveform. The reference patterns of one filter are rotated ninety degrees from the other. For non-coherently demodulated FSK waveforms, rather than the references being in quadrature, one filter uses the message Mark frequency offset as a reference and the other filter uses the Space frequency offset as a reference. The expected Mark frequency and Space frequency are known to the system designer. Each filter multiplies the single-bit baseband input by samples of the reference waveform and then accumulates the products. At the end of each bit period, the integrations are shifted into two 2-stage shift registers 1510, 1512, 1514, 1516 to produce the outputs QA, IA, QB, IB, respectively, and then are cleared.

For all coherent demodulation except MSK, the vector summer 1306 (FIG. 13) sums two stages in one shift register at the end of each matched filter integration. The vector summer will be better understood with reference to FIG. 16, which shows that the QA, IA, QB, IB outputs are received from the 2-bit shift registers 1510, 1512, 1514, 1516 (FIG. 15) and are integrated in a set of integrators 1602, 1604, 1606, 1608. In the following description, references will be to the primary I waveform processing illustrated in FIG. 16. The quadrature Q waveform processing components are not shown for clarity, but should be understood to apply the same structure and processing as the I waveform components.

After summing of the integration results, the magnitude comparator of the HDR demodulator multiplies the sum by the reference vector register 1620. A summation control block 1622 then controls summing from the register. In particular, a block of multiplexers and delay registers sums the incoming IA and IB data to detect a change in phase of the incoming signal in comparison with the reference register value. When the sign of the product is 0, indicating a positive result, the sum of the shift register is added to the reference vector. When the sign of the product is 1, indicating a negative result, the sum of the shift register is instead subtracted from the reference vector. The vector summer sums each shift register 1602, 1604, 1606, 1608 on an alternating basis.

In the case of MSK demodulation, the description above applies, except that the vector summer adds (subtracts) to or from the reference vector the sum of the last stage (the oldest data) of each shift register, rather than adding or subtracting both stages from one shift register. The reference vector is actually the sum of up to the last four filter results. When a new filter vector is added (subtracted) to the reference vector, the oldest is subtracted. For non-coherent FSK demodulation, the magnitude comparator compares the magnitude (actually only the sum-of-squares) of the Mark filter vector to the Space filter vector to make the data decision. FSK demodulation does not require the reference vector.

Pulse Position Modulation (PPM) Mode

The HDR demodulator also operates in a pulse position modulation mode, in which only predetermined pulse waveforms are sent and information is derived from the timing between successive pulse waveforms. The delay from one pulse to the next contains the information. For example, delays might be in increments of eight different values. A delay of one increment might represent the three bit symbol 000, and a maximum delay of eight increments might represent the symbol 111. For this purpose, the HDR demodulator uses a timer register 812 (FIG. 8) in the transmit path. The measurement of this time interval between pulses is computed by the host processor. In the preferred embodiment of the ASIC chip, the timer register is part of the transmit data path that is used put to dual use with the HDR demodulator and the transmit data path. The timer register is used to record the local time of arrival of each pulse, the host processor determines which one of the eight difference values is represented by the pulse time of arrival information. In this way, the circuit elements needed for the TACTS demodulator to perform multilateral triangulation distance measuring by measuring the phase of a sinusoidal signal modulated onto a carrier frequency also can be used by the HDR demodulator to perform pulse position demodulation.

Carrier Signal Tracking With the HDR Correlator

Information can be transmitted in the combat training system 100 using phase shift key modulation by changing the phase of a sine wave signal. For example, a predetermined phase may represent a zero bit, and a phase different from the predetermined phase by 180 degrees may represent a one bit. A transmitting installation therefore will transmit an unmodified carrier signal when a zero bit is intended, and will reverse the phase of the transmitted carrier signal when a one bit is intended. Thus, it becomes important to determine the phase of a received signal with respect to the phase of a reference carrier signal. If the received signal is in phase with the carrier signal, a zero bit is indicated. If the received signal is out of phase with the carrier signal, a one bit is indicated.

The present invention makes use of this in-phase/out-of-phase modulation to determine the reference carrier signal phase and determine the bit of information received. This processing can be better understood by viewing the received signal data as a vector, as illustrated in FIG. 22.

Figure 22:
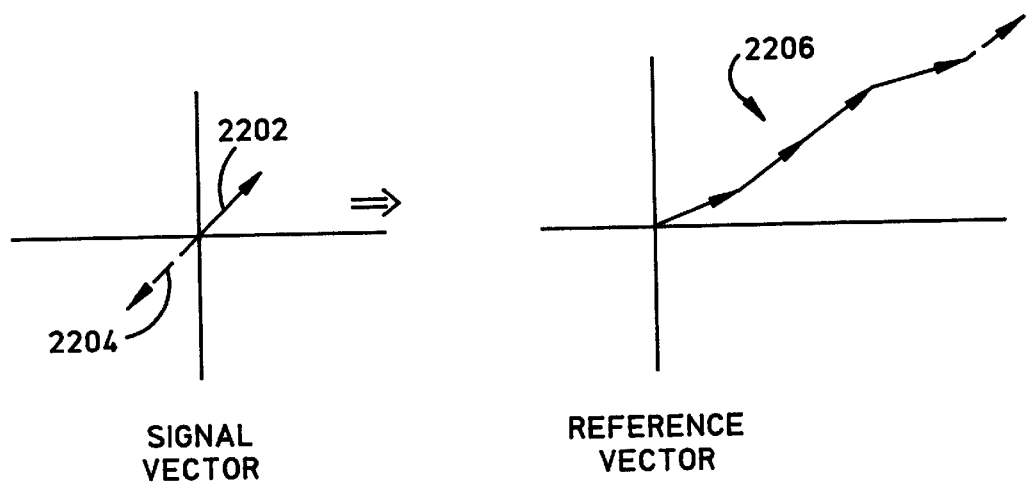
FIG. 22 is a representation of the vector summing operation carried out by the vector summer illustrated in FIG. 16.

FIG. 22 shows two vector representations, a signal vector that represents the received signal as a complex number in a vector space, wherein the solid vector arrow 2202 represents a signal that is in-phase with a hypothetical reference carrier signal and the dashed vector arrow 2204 represents a signal that is out-of-phase with the hypothetical reference carrier signal. FIG. 22 also shows a reference vector 2206, represented as the vector sum of the four previous signal vectors (with data modulation removed) received by the ASIC chip. It can be seen that there is some variation from received vector to received vector.

In accordance with the invention, as each new signal vector is received, it is compared to the reference vector. If the signal vector is in phase with the reference vector, then the signal vector is taken to be a zero bit. The signal vector is then added to the three prior received signal vectors to form a new four-term vector sum that becomes the new reference vector. If the signal vector is out of phase with the reference vector, then the signal vector phase is inverted (restoring its phase to what should be the phase of the actual carrier signal), and then the inverted signal vector is summed with the three prior received signal vectors to for a new four-term vector sum that defines the new reference vector.

In FIG. 16, a bank of multiplexers and delay registers 1624 and inverting multipliers 1626 performs the phase comparison and inverting of the signal vectur (again, only the primary I components are shown; the quadrature Q components are not shown for clarity). The demodulated symbol is produced from the adder 1628 (the quadrature adder is not shown for clarity). The reference register 1620 contains the four-terms of the vector sum. In the preferred embodiment, the phase comparison is performed by taking the vector dot product of the respective primary I and quadrature Q terms of the signal vector and reference vector, as indicated by two multipliers 1630, 1632 and adder 1634. If the dot product is positive, the signal vector is in phase, and if the dot product is negative, the signal vector is out of phase. The indicated demodulated data output then is a binary decision result, either a zero or a one. The decision bit is then used by the summation control 1622 in setting the multiplexers 1624 and multipliers 1626, so that an in-phase signal vector is added directly into the reference register 1620 and an out-of-phase signal vector is first inverted before being added into the reference register.

The operation of the vector summer then follows the following processing steps:

(1) Determine signal vector phase with respect to reference vector.

(2) If signal vector is in-phase, add to three most recent summed signal vectors.

(3) If signal vector is out-of-phase, invert signal vector before adding.

(4) Use the new four-term vector sum as the reference vector for next comparison.

It should be noted that the number of vectors comprising the reference vector can be changed by the host processor, if desired, to be less than four. A lesser number of vectors may be advantageous, for example, if it is known that the reference vector may be rapidly changing due to frequency uncertainty. Moreover, those skilled in the art will appreciate that multiple shift keyed waveforms may be processed, including binary phase shift key (BPSK), multiple shift key (MSK), and quadrature phase shift key (QPSK). Those skilled in the art will also appreciate that the initial reference vector values loaded into the reference register 1620 can be derived from a preamble message waveform because the bit data values are known a priori.

Thus, the vector summer of the ASIC chip is superior to conventional phase locked loop schemes for identifying carrier signal phase. By conditionally inverting and summing the signal vectors, the vector summer of the invention considers both magnitude and direction of signal vectors and thereby achieves superior results from conventional PLL designs.

The Range Tone Processor

The TACTS specification uses three range tones simultaneously phase-modulated on the carrier signal to perform distance measuring. Because the tones are modulated at indices up to 8.1 radians, narrow band bandpass feedback is used in the receiver on each tone to reduce the index seen at the demodulator. In most cases, this feedback is performed by modulating the filtered tones onto the first local oscillator (LO) of the receiver. In transponders and remotes, the same tones are also modulated on their associated transmitter because they so closely track the phase of the received tones. The range tone processing section of the ASIC chip provides three independently programmable bandpass filters, independent phase adjustments for each filter, loop gain adjustment, three programmable range tone generators, and three phase meters that measure the phase between the locally generated tones and the received tones. The range tone processor 408, initially depicted in FIG. 4, is shown in greater detail in FIG. 17.

Figure 17:
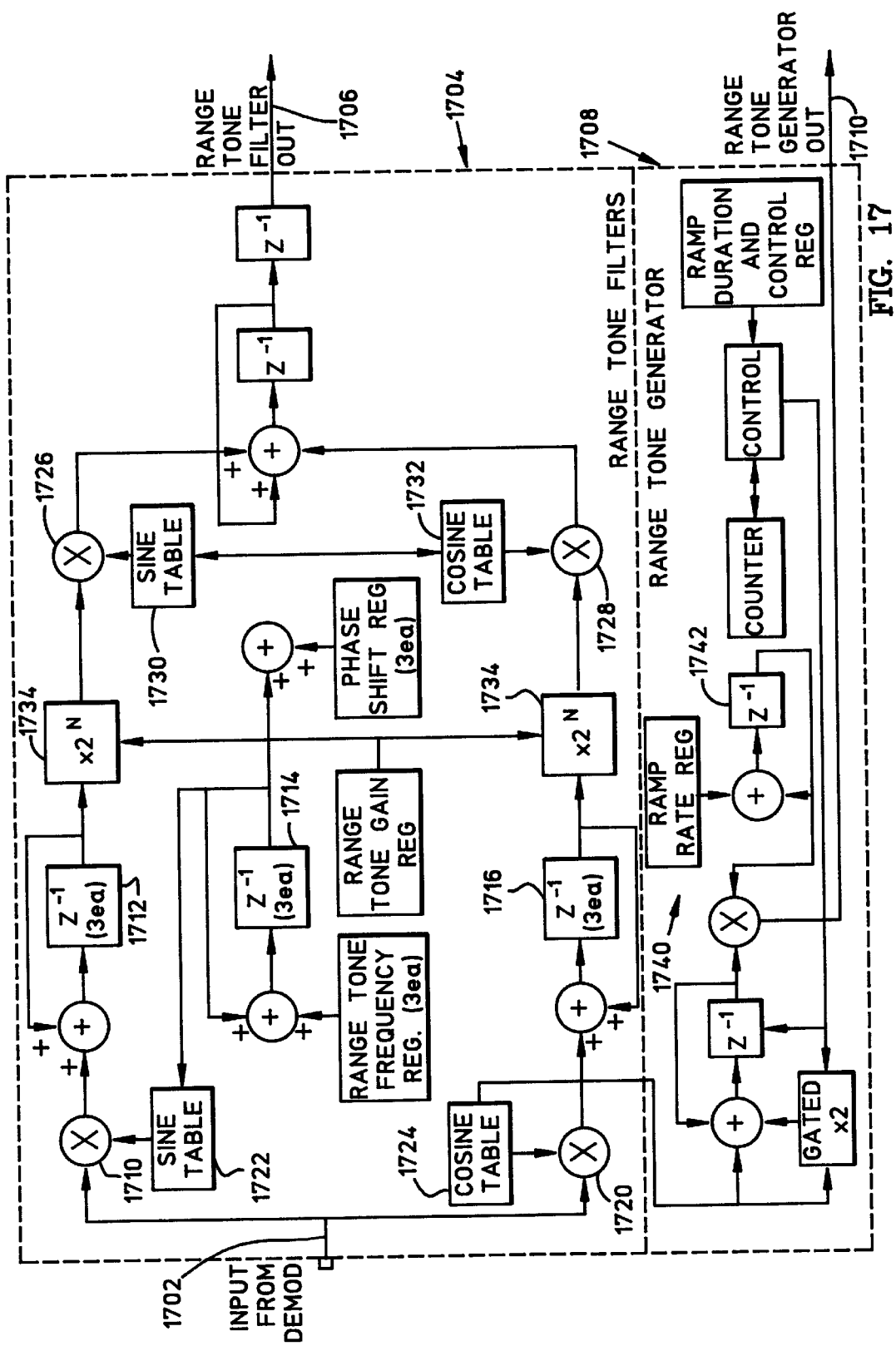
FIG. 17 is a block diagram of the TACTS range tone processor shown in FIG. 4.

FIG. 17 shows that the range tone processor receives an input signal over an input line 1702 from the TACTS demodulator 402 (FIG. 4) into a range tone filter block 1704 at a sample rate of $F_S/8$, from which a range tone filter output 1706 is produced. The range tone filter block shares intermediate signals with a range tone generator block 1708, which produces a range tone generator output 1710. The range tone filter block 1704 includes three independent bandpass filters, each having bandpass integrator characteristics to perform range tone filtering. Each of the three bandpass integrator filters includes a $Z^{(-1)}$ acting as an integrator block 1712, 1714, 1716, although in FIG. 17 only one of each block is shown, for clarity. The use of the arithmetic functions is time multiplexed between the three filters. These filters provide the desired high loop gain and low group delay desired for stable closed loop characteristics.

Each of the filters mixes the input signal through multiplexers 1718, 1720 with a signal from a quadrature digital local oscillator (LO) 1722, 1724 at the desired center frequency, integrating or accumulating the product signals in the baseband with the integrators 1712, 1716 and then mixing the signals through multiplexers 1726, 1728 back to the center frequency using a signal from a quadrature digital LO 1730, 1732 at the same center frequency. Although only one digital LO is illustrated, it should be understood that there is effectively one LO for each filter/integrator sharing a common set of arithmetic functions. The digital LO's are generated with a programmable center frequency $F_{OSC}$ generated from numerically controlled oscillators (NCO's) driving sine and cosine look-up tables, according to the equation:

$$F_{OSC}=(F_S')n/2^{24},$$

where $F_S'$ is the sample frequency and n is the number of sine or cosine terms, respectively. The phase shift of each filter may be adjusted by adding a fixed offset to the output of the NCO before feeding the up-conversion sine and cosine look-up tables and mixers. The phase offset M is given by) $M=2Bn/64$.

A programmable barrel shifter 1734 provides loop gain adjustments in powers of two. Because the filters comprise bandpass integrators, the open-loop bandwidth is theoretically zero and the gain is theoretically infinite at the center frequency. Therefore, conventional gain-times-open-loop-bandwidth methods for computing the closed-loop bandwidth cannot be used. Instead, the closed-loop bandwidth becomes the bandwidth within which the open loop gain exceeds unity. The closed-loop bandwidth BW (two-sided, 3 dB, in Hz) is given by:

$$BW \approx F_S'(G/B),$$

where G is the open-loop gain not counting the integration of the bandpass filter, and G<<1.

The sine output from each of the three mix-down LO's 1730. 1732 generates the three range tones for use by the host microprocessor. One of the tones is multiplied by three before summing with the other two (not illustrated). This gives the three-to-one modulation index relationship desired to produce one fine tone and two coarser tones. A ramp function 1740 multiplies the summed tones by the output of an accumulator 1742 that accumulates a programmable ramp rate constant. This provides for a linear gradual turn on or off of the range tones. As noted previously, all stored constants and data are available from ASIC chip registers, controlled by the host microprocessor, that form the processor interface 232 (FIG. 4).

The accumulation of the ramp function begins at the setting of a control bit by the host microprocessor and continues at each sample time for a programmable duration. The resultant value is held for a programmable duration (again, set by the host microprocessor), and then the accumulation either ramps back down to zero at the same rate at which it rose, or descends immediately to zero, depending on the state of a programmable control bit that is set by the host microprocessor and available through the processor interface. The modulation index of the higher tone will be given by:

$$\text{Index} = RN\{[\sin c(K_T/5340354)]^3\}/222519,$$

where R is the value in the ramp rate register 1740, N is the value of the ramp duration, and $K_T$ is the range tone frequency setting constant. This index is multiplied by 9 if the times-9 function is enabled in the interpolator (described further below).

The range tone processor 408 also performs phase metering by separately integrating (for a programmable time) each of the filtered baseband components I and Q of each of the range tone filters. The results represent the real and imaginary components of vectors whose angles are the difference between the phase of the local tone generator and the phase of the received tone, with a fixed offset that depends on the phase-shifter setting and other external parameters set through the host microprocessor according to design choice. The magnitude is proportional to the received modulation index. In the preferred embodiment, the ASIC chip is driven by the same system master clock generator that supplied the installation that generated the range tones, and therefore the phase offset in the phase meter measurements will remain relatively stable and will be removed by standard calibration techniques used with TACTS installations.

Integration begins either immediately upon the setting of the control bit or after a fixed delay following detection of a preamble. Basing the integration start time on the received message's preamble permits a longer integration time to be used, thereby reducing the measurement noise, and ensures that all the ranges from separate master receivers represent the same position in space and a known fixed time delay relative to the time of inertial measurements.

The filter accumulators are cleared whenever the external host microprocessor disables the receiver or when the internal carrier detect signal indicates loss of carrier signal. This prevents receiver noise from modulating the LO or transmitter when no signal is present, and removes any residual energy from the filters at the end of a message. A 1:8 interpolation filter brings the sample rate back to the FS sample frequency. The increased sample rate supports the higher bandwidth generated when going through the non-linear process of the sine and cosine tables with high modulation indices to create the final modulation waveform.

Digital Interpolators

Figure 18:
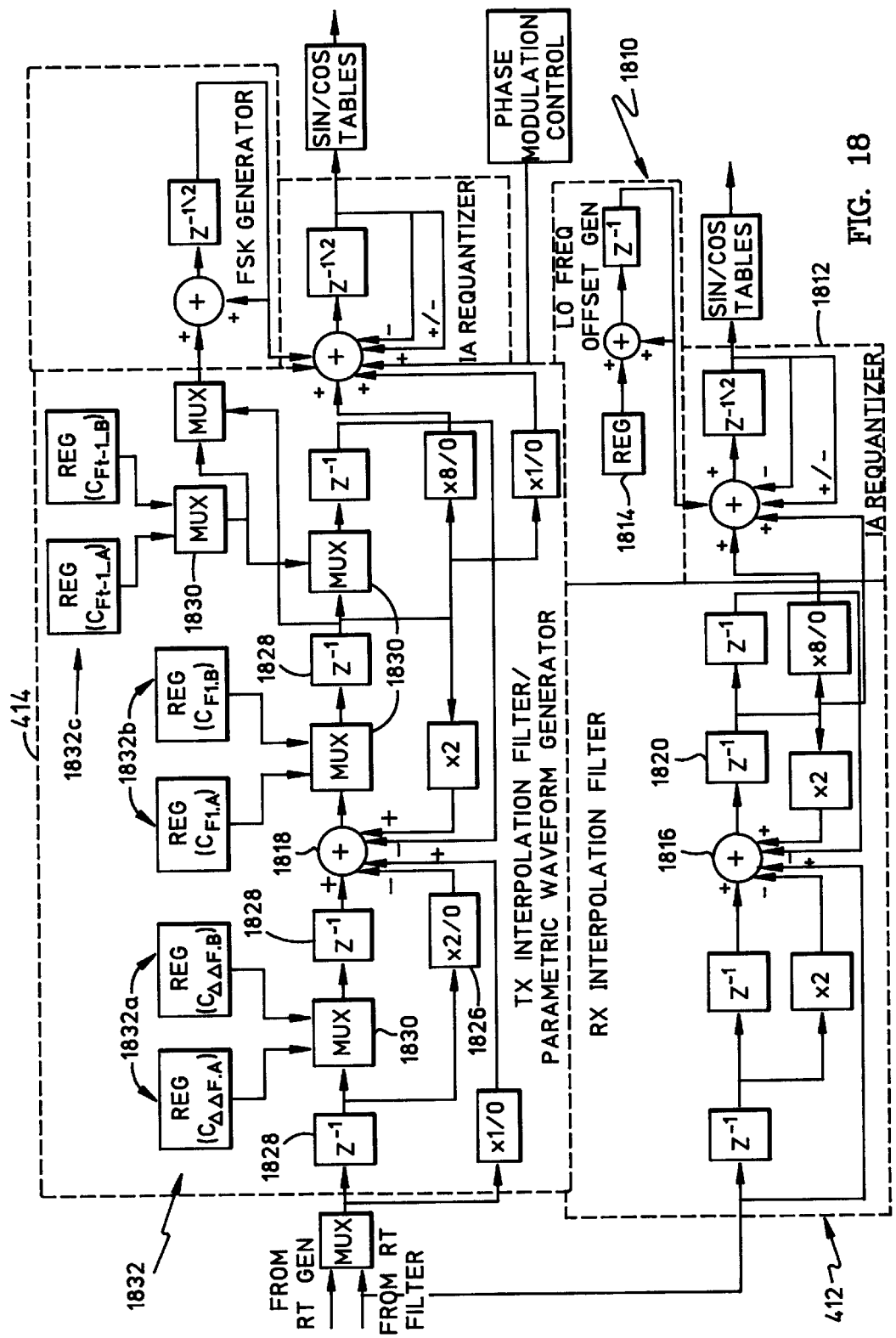
FIG. 18 is a block diagram of each digital interpolator (transmit and receive) shown in FIG. 4.

The ASIC chip includes two Digital Interpolators (DIs), one for feedback to the receive path (RX) 412 and one for the transmit path (TX) 414. These DIs are shown initially in FIG. 4 and are shown in greater detail in FIG. 18. The ASIC chip has two range tone modulation sources (the range tone generator and the range tone filters) because the TACTS function requires two separately modulated outputs with different range tone indices, and/or range tone sources. The receiver DI 412 only interpolates range tone data (received from the range tone processor) and modulates the range tones onto an LO offset generator 1810 through the sigma-delta requantizer 1812 and other components external to the ASIC. The receiver path DI 412 has a static NCO programmed via a register 1814 to allow fixed frequency offsetting of the LO but does not provide for data modulation. The transmit DI 414 has 4 operating modes:

1. TACTS NCO and range tone interpolation
2. HDR NCO
3. HDR Parametric Waveform Generator (PWG)
4. Pulse Position Modulation (PPM) PWG.

In the TACTS NCO mode, the transmit path DI 141 interpolates range tone data and adds the range tones to the output of the transmit data controlled NCO. In the HDR NCO mode, the transmit path DI operates only as a transmit data controlled NCO. The input from the range tone processor 408 (FIG. 4) is masked. In the PPM PWG mode, the transmit path DI operates in a parametric waveform generator mode and uses a virtually unlimited set of coefficients. The DI loads the PWG with a new set of coefficients to generate pulses with frequencies that vary over time. The interpolation function uses a well-known structure called a Hogenauer filter in a second order configuration and produces a frequency response of $(\sin x/x)^3$ with nulls at multiples of the input sample rate.

The Hogenauer filter implementation breaks the receive path interpolation filter 412 into a double-difference function at the input sample rate (implemented via the three feed forward paths into the adder 1816), which gives a $(\sin x)^2$ frequency response, followed by a sample-and-hold 8:1 up sampler (the register 1820) that gives a $(\sin x/x)$ response, followed by a double accumulation at the output sample rate (implemented via the two feedback paths into the adder 1816), which gives a $(1/x)^2$ response. There are no coefficients to program to achieve the filter shape.

For the parametric waveform generator/transmit filter DI 414, all waveforms other than range tones are generated at the output sample rate. In the TACTS mode, because the CPFSK is also generated in the phase domain, it is added directly to the interpolated range tones and the composite waveform is modulated onto the carrier signal. In the HDR modes, the transmit path DI 414 can operate as a simple PSK, DPSK, QPSK, or OQPSK modulation generator where four phase shifts, in 90 degree increments, can be added to the LO, or the DI can operate as a simple FSK modulation generator where the LO is operated as an NCO. The transmit path DI 414 can also operate as a parametric waveform generator to produce modified MSK and PPM waveforms.

Dual Function Transmit Interpolation Filter and Parametric Waveform Generator

By selection of register values and multiplexer settings, the transmit path DI 414 can be configured so that the signal path through it essentially duplicates that of the receive path DI 412. That is, the "x2" multiplication blocks 1826 of the transmit path DI 414 can be inserted into the signal path, along with the $Z^{(-1)}$ delay registers 1828, so that the signal path corresponds to the configuration shown for the receive path interpolation filter 412, and in that configuration the transmit path DI operates as an interpolation filter. In the interpolation filter mode, these filters supply the signal used by the local oscillators (LO) shown in FIG. 2. When the multiplexers 1830 of the transmit path DI 414 are set to load values from coefficient registers 1832, the transmit DI can function as a parametric waveform generator. Thus, the transmit path DI 414 has a dual function.

Figure 20:
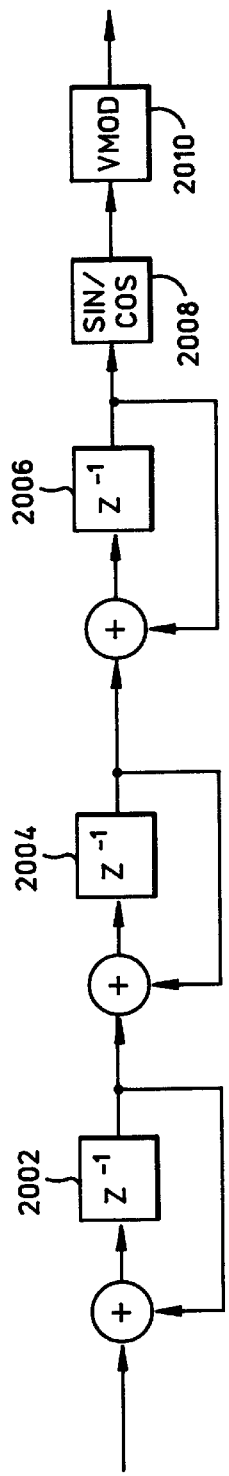
FIG. 20 is a representation of the functioning of the transmit path DI shown in FIG. 18 when operating as a parametric waveform generator.

The "/0" of the "x2" multiplication block 1826 indicates that the block is essentially zero (no effect) in the PWG mode. In this way, the various delay registers 1828 can be considered as signal integrators that form a programmable signal generator whose output drives sine and cosine tables to produce an output function. This is illustrated in the FIG. 20, a simplified functional representation of the parametric waveform generator. For ease of understanding, the circuit is shown in a nearly equivalent form as three cascaded digital integrators (accumulators). 2002, 2004, 2006, whose initial conditions and input 2012 can be set by registers that are in turn programmed via the µP interface. This configuration can produce any phase versus time waveform that can be described by a third order polynomial in time. In the preferred embodiment the initial phase 2006 is not setable, but maintains the value it had at the end of the previous waveform, thus guarantying phase continuity of a series of waveforms. An example of a waveform that can be produced is a nonlinear chirp waveform used in pulse position modulation and pulse range measurement systems. It can also be configured to produce a spectrally efficient class of data waveforms similar to MSK, but having nonlinear phase transitions from one bit to the next instead of MSKs linear transition. A pair of registers is provided for each initial condition parameter so that one can be in use while the other is being loaded, or two set of parameters can be kept for use as different symbols in binary signaling. The PWG can be started with a new set of initialization parameters on the fly in one clock cycle. The initial value of 2006 defines the starting phase of the waveform. The initial value of 2004 sets the initial frequency. The initial value of 2002 sets the initial linear rate of change of frequency. Finally, the value applied to line 2012 sets the third order term, i.e., the second derivative of frequency. To minimize the circuit complexity the actual implementation has a slightly different topology that provides the same output function but produces slightly different intermediate states. Because of this the initial values of frequency and frequency rate are not set independently. The actual initialization values become the initial frequency 1832*c* and the frequency that would have existed one clock before the initial state at the desired initial frequency rate 1832*b* instead of frequency rate as in 2002. The third order term 1832*a* is the same as for 2012.

Timing Adjustment of Pulse Waveforms for Pulse Ranging

One of the novel features of the ASIC chip is the fine timing adjustment that is possible with the parametric waveform generator of the transmit path DI 414. In chirp pulse ranging operations, an ASIC chip installation must receive a chirp pulse waveform and then retransmit that waveform after a specified delay interval. The propagation of the pulse waveform and the specified delays through the combat training system 100 can be used to determine range between installations. Because the ASIC chip system clock operates at a fixed frequency (in the preferred embodiment, it is a 50 nanosecond clock), any pulse waveform can only be retransmitted in accordance with 50 nanosecond intervals. For more precise pulse ranging, however, it may be desirable to permit a delay of less than one 50 nanosecond interval. Conventionally, a surface acoustic wave (SAW) generator is used to generate the pulse waveforms, such that a predetermined pulse waveform is produced for a given input signal. That is, the retransmitted pulse waveform cannot be generated at greater timing resolution than permitted by the system clock frequency. Therefore, greater delay resolution on the retransmitted pulse waveform can only be provided with a faster system clock.

In contrast, with the invention, the pulse waveform generated for pulse ranging operations is produced with a programmable, parametric waveform generator that can make small adjustments to the starting frequency of the retransmitted pulse waveform such that at the receiving installation it appears to receive a retransmitted signal with a time of arrival having a greater resolution than is possible with the system clock of the retransmitting installation. In the combination transmit DI interpolation filter/parametric waveform generator 414 of the ASIC chip, the pulse waveform is generated with a series of coefficient registers 1830 that are inserted into the signal path under control of multiplexers 1832. For each multiplexer, two coefficient registers are shown, one register being used to produce an "A" term for a first waveform, and the other register being used to produce a "B" term for a second waveform (if desired). This permits fine adjustment to the pulse waveform frequency to achieve apparent greater-than-clock-frequency resolution, as described below.

Figure 21:
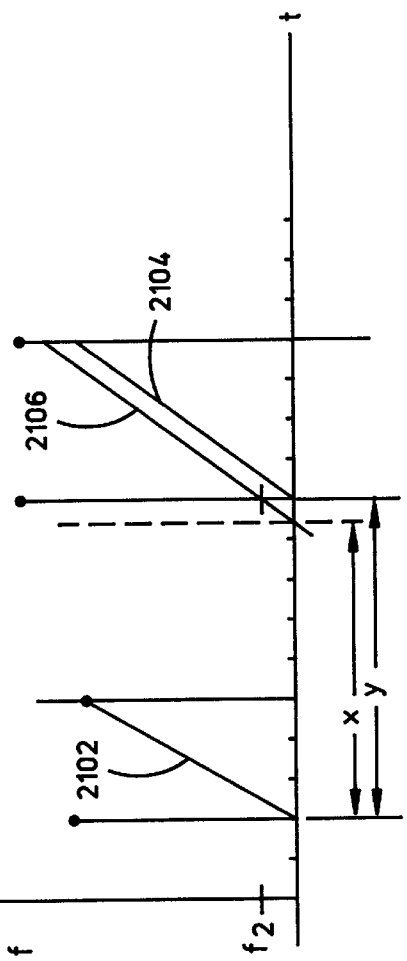
FIG. 21 is a diagram of the timing adjustment effected by the correlator of the HDR demodulator illustrated in FIG. 4.

FIG. 21 illustrates a pulse waveform chirp signal comprising a rising frequency signal, shown as a "ramp" waveform 2102. Signal frequency is shown on the vertical axis and time is shown on the horizontal axis. The ASIC chip must retransmit the pulse waveform 2104 after what appears to be the specified delay time interval, the delay being shown as the interval "x" in FIG. 21. System clock intervals are represented as index marks along the time axis, and the closest clock available is at time Y. In accordance with the invention, the host processor can adjust the coefficient values to change the starting frequency of the retransmitted pulse waveform, as represented by the line 2106 in FIG. 21. In particular, as illustrated in FIG. 21, the retransmitted pulse waveform can be started after the delay interval x at a frequency $f_2$ rather than at 0. In this way, the installation that is to receive the retransmitted pulse waveform will detect a signal having an apparent starting time (in the retransmitting ASIC chip) of X a resolution that appears to be finer than the ASIC chip system clock allows. That is, the adjustment to the starting frequency causes the peak correlation to occur earlier than what would be expect based on the actual start of the pulse. This can make it seem that the ASIC chip received the pulse waveform and retransmitted it at a clock time having finer resolution (time intervals less than) the 50-nanosecond limit of the system clock.

Auto Loader

Figure 19:
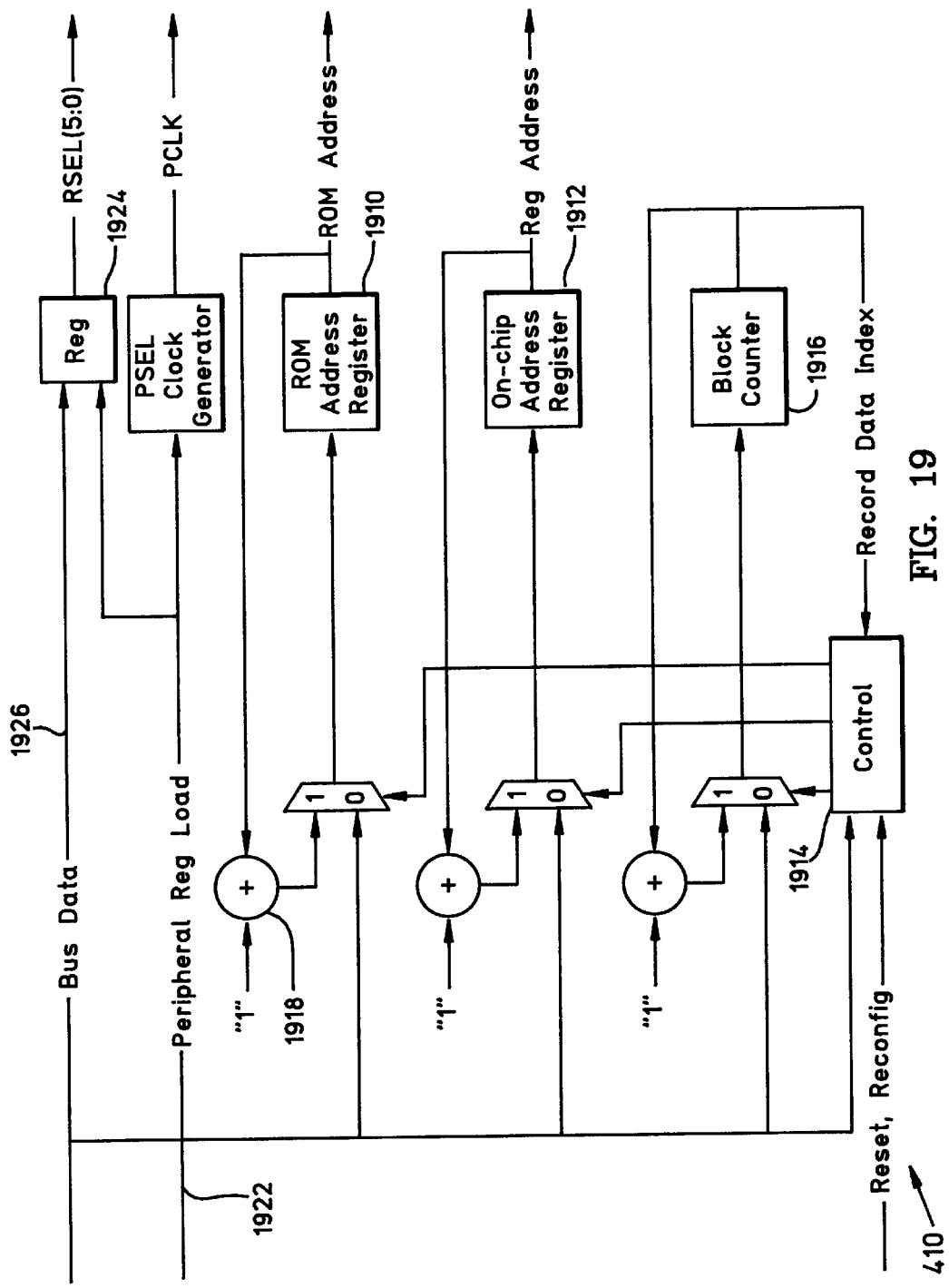
FIG. 19 is a block diagram of the autoloader shown in FIG. 4.

An auto loader performs register configuration functions in the absence of an external processor. The auto loader 410 is shown initially in FIG. 4 and is shown in greater detail in FIG. 19. The auto loader is capable of directly addressing an 8K×8 ROM device, and can quickly configure or reconfigure the ASIC chip for various operating modes by setting register values, under control of the host processor. The auto loader is also capable of performing its own power-up built-in-test (BIT) functions.

The auto loader 410 shares DI output pins to address and read data from a single 8-bit wide ROM. When an auto-load sequence is in progress, the auto loader reads configuration data from sequential ROM locations identified by a ROM address register 1910, assembles two data bytes into a single 16-bit word (LSB read first, then the MSB), and then writes the data to the selected on-chip register. The on-chip register is selected from the address in the register 1912. Data loading is controlled by a control block 1914 and a block counter 1916.

The data in the ROM is in a data record format. The first two bytes in the record are the header. The first header byte specifies the first on-chip register number to be written. The second byte is the record length, which specifies the number of registers to be written with data in the record. The auto loader reads the record header and writes the next two bytes that are read to the register specified in the header. The auto loader then increments the register number by one for the next two bytes read, using an adder 1918. This continues until the number of words specified in the header have been written, after which the auto loader can switch to a new sequence of on-chip registers. The auto loader continues reading bytes from ROM and then writing them to the on-chip registers until a record length of 255 bytes is read. When the record length of 255 has been read, the auto loader disables the ROM and returns the DI outputs to their normal operating states.

The ASIC chip can perform power-up BIT by configuring itself from the configuration ROM in a valid loop-back configuration, loading data into the transmit data FIFO, and then enabling the receiver and transmitter. At completion of BIT, a receive checksum register may be read to verify that the ASIC chip generated the expected signature.

A peripheral register is capable of configuring attached programmable peripherals either via the processor interface 232 or the auto loader. The peripheral register is capable of configuring various peripherals such as RAMDACs and synthesizers. The peripheral register is loaded with bus data 1926 when the peripheral register address is decoded and activates the peripheral register load signal 1922.

The peripheral loader interface consists of two control registers that control six static control pins, one clock pin, and sixteen parallel data pins. One register controls the six static control pins and the duration and sense of the clock strobe. A write to this register sets the state of the six static control pins and simultaneously, when enabled, generates a clock strobe of variable duration. A write to the other register places eight bits of data written to the register on the Q output pins of the transmit and receive DIs and simultaneously generates the variable duration clock strobe.

A serially programmable Synthesizer may be programmed by connecting its Data and Enable inputs to just two control pins and its Clock input to the clock strobe.

Test Port

The ASIC chip is provided with a test port 416, shown in FIG. 4. In the preferred embodiment, the test port consists of two multiplexers used to select various signals internal to the ASIC chip and provide them to external pins. One is used to select eight of 384 nodes for monitoring. The other is used to select one of eight different clock sources to demultiplex information from time-multiplexed signals. The test port is intended to be used not only for ASIC chip fabrication verification, but also for in-system diagnostic purposes. For example, in the TACTS mode, one of the more useful signals to monitor is the Phase-Error signal. In the HDR mode, one of the more useful signals to monitor is the correlator magnitude signal. Both of these signals may be connected to an 8-bit digital-to-analog converter (DAC) external to the ASIC chip and monitored in real-time with an oscilloscope.

Advantages of the Invention

The present invention provides an ASIC chip that can interface with multiple data protocol specifications. The ASIC chip includes a demodulator for a first data protocol with a data clock recovery circuit that permits precise phase alignment of the demodulator clock with the clock of the data generating device, such as the aircraft. The demodulator permits quicker response, better immunity to noise, and better signal updating as new sample data is received. The ASIC chip also includes a demodulator for the second protocol (HDR) having a digital correlator that acts as a matched filter to quickly and accurately detect a message preamble, and a carrier phase tracking circuit to more precisely track the carrier phase for signals under consideration, and further includes a dual function transmit path digital interpolator (DI) that is used as an interpolator for range measurement functions and then also functions as a parametric waveform generator when transmitting pulse waveform data. In addition, the digital correlator permits capturing correlation values near the peak of correlation and making them available to the host processor where the time of arrival (TOA) estimate can be refined to much finer than one clock cycle time. Finally, when generating chirp pulse waveforms for ranging, the ASIC chip can perform signal timing adjustments that permit a receiving chip to determine a message delay interval with an apparent fidelity that is greater than the actual transmit clock of the transmitting ASIC chip. In this way, the ASIC chip provides a processing system that can operate with multiple data protocol specifications and data rates, while ensuring accurate and reliable detection of data streams in an aircraft operational environment.

The present invention has been described above in terms of a presently preferred embodiment so that an understanding of the present invention can be conveyed. There are, however, many configurations for signal processing integrated circuit chips not specifically described herein but with which the present invention is applicable. The present invention should therefore not be seen as limited to the particular embodiments described herein, but rather, it should be understood that the present invention has wide applicability with respect to signal processing integrated circuit chips generally. All modifications, variations, or equivalent arrangements and implementations that are within the scope of the attached claims should therefore be considered within the scope of the invention.

We claim:

1. An apparatus for processing data messages under control of a host processor, the apparatus having a receive data path through which received messages are processed, and having a transmit data path through which transmit messages are processed independently from the received messages, such that messages in a first data protocol and a second data protocol can be processed by the receive data path and the transmit data path, the apparatus comprising:

a downconverter that receives sample data of data messages at an intermediate frequency;

a first protocol demodulator that receives sample data from the downconverter and processes the received messages according to the first data protocol;

a second protocol demodulator that receives sample data from the downconverter and processes the received messages according to the second data protocol; and a processor interface through which the apparatus exchanges data with the host processor;

wherein the second protocol demodulator includes a digital correlator comprising a matched filter that further includes a vector summer that sums sample data values to form a reference vector and then compares a current sample data value comprising a signal vector to the reference vector such that a signal vector that is in phase with the reference vector is added to the reference vector to produce a new reference vector value, and a signal vector that is out of phase with the reference vector is inverted before being added to the reference vector.

2. An apparatus for processing data messages under control of a host processor, the apparatus having a receive data path through which received messages are processed, and having a transmit data path through which transmit messages are processed independently from the received messages, such that messages in a first data protocol and a second data protocol can be processed by the receive data path and the transmit data path, the apparatus comprising:
- a downconverter that receives sample data of data messages at an intermediate frequency;
- a first protocol demodulator that receives sample data from the downconverter and processes the received messages according to the first data protocol;
- a second protocol demodulator that receives sample data from the downconverter and processes the received messages according to the second data protocol;
- a processor interface through which the apparatus exchanges data with the host processor; and
- a transmit path digital interpolator that operates as an interpolation filter that interpolates range tone data received from the host processor for range measurement functions and that also operates as a parametric waveform generator for transmitting range data over the transmit data path.

3. An apparatus as defined in claim 2, wherein the transmit path digital interpolator is implemented as a Hogenauer filter when operating as an interpolation filter.

4. An apparatus for processing data messages under control of a host processor, the apparatus having a receive data path through which received messages are processed, and having a transmit data path through which transmit messages are processed independently from the received messages, such that messages in a first data protocol and a second data protocol can be processed by the receive data path and the transmit data path, the apparatus comprising:
- a downconverter that receives sample data of data messages at an intermediate frequency;
- a first protocol demodulator that receives sample data from the downconverter and processes the received messages according to the first data protocol;
- a second protocol demodulator that receives sample data from the downconverter and processes the received messages according to the second data protocol; and
- a processor interface through which the apparatus exchanges data with the host processor;

wherein the second protocol demodulator includes a digital correlator that stores signal sample values around a correlator threshold value such that the host processor performs interpolation post processing on the stored signal sample values when a signal sample value crosses the threshold value, thereby determining a message arrival time to a resolution finer than that of the system time clock.

5. An apparatus as defined in claim 4, wherein the digital correlator includes a first-in, first-out (FIFO) register in which the signal sample values are stored.

6. An apparatus for processing data messages under control of a host processor, the apparatus having a receive data path through which received messages are processed, and having a transmit data path through which transmit messages are processed independently from the received messages, such that messages in a first data protocol and a second data protocol can be processed by the receive data path and the transmit data path, the apparatus comprising:
- a downconverter that receives sample data of data messages at an intermediate frequency;
- a first protocol demodulator that receives sample data from the downconverter and processes the received messages according to the first data protocol;
- a second protocol demodulator that receives sample data from the downconverter and processes the received messages according to the second data protocol; and
- a processor interface through which the apparatus exchanges data with the host processor;

wherein the second protocol demodulator includes a digital correlator that includes a programmable parametric waveform generator that adjusts the starting frequency of a pulse waveform to provide an apparent message delay interval that is finer than the resolution of the system clock.

7. An apparatus as defined in claim 6, wherein the pulse waveform is generated by the parametric waveform generator using waveform coefficient values defined by coefficient registers.

8. An apparatus for processing data messages under control of a host processor, the apparatus having a receive data path through which received messages are processed, and having a transmit data path through which transmit messages are processed independently from the received messages, such that messages in a first data protocol and a second data protocol can be processed by the receive data path and the transmit data path, the apparatus comprising:
- a downconverter that receives sample data of data messages at an intermediate frequency;
- a first protocol demodulator that receives sample data from the downconverter and processes the received messages according to the first data protocol;
- a second protocol demodulator that receives sample data from the downconverter and processes the received messages according to the second data protocol;
- a processor interface through which the apparatus exchanges data with the host processor; and
- a digital correlator having
  - a vector summer that sums sample data values to form a reference vector and then compares a current sample data value comprising a signal vector to the reference vector such that a signal vector that is in phase with the reference vector is added to the reference vector to produce a new reference vector value, and a signal vector that is out of phase with the reference vector is inverted before being added to the reference vector,
  - a first-in, first-out (FIFO) storage register that stores signal sample values around a correlator threshold value such that the host processor performs interpolation post processing on the stored signal sample values when a signal sample value crosses the threshold value, thereby determining a message arrival time to a resolution finer than that of the system time clock, and
  - a programmable parametric waveform generator that adjusts the starting frequency of a pulse waveform to provide an apparent message delay interval that is finer than the resolution of the system clock.

* * * * *